United States Patent
Evans et al.

(10) Patent No.: US 10,457,392 B1
(45) Date of Patent: Oct. 29, 2019

(54) MOBILE BASE UTILIZING AUTOMATED AERIAL VEHICLES FOR DELIVERING ITEMS

(71) Applicant: Amazon Technologies, Inc., Seattle, WA (US)

(72) Inventors: Ethan Zane Evans, Sumner, WA (US); Atishkumar Kalyan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/489,538

(22) Filed: Apr. 17, 2017

Related U.S. Application Data

(63) Continuation of application No. 14/569,511, filed on Dec. 12, 2014, now Pat. No. 9,656,805.

(51) Int. Cl.
| | | |
|---|---|---|
| *G06F 7/00* | (2006.01) | |
| *B64C 39/02* | (2006.01) | |
| *G06Q 10/08* | (2012.01) | |
| *G05B 19/418* | (2006.01) | |
| *G08G 5/00* | (2006.01) | |
| *B64D 1/12* | (2006.01) | |

(52) U.S. Cl.
CPC .......... *B64C 39/024* (2013.01); *B64C 39/028* (2013.01); *B64D 1/12* (2013.01); *G05B 19/4182* (2013.01); *G06Q 10/083* (2013.01); *G08G 5/0069* (2013.01); *B64C 2201/108* (2013.01); *B64C 2201/128* (2013.01); *B64C 2201/14* (2013.01); *B64C 2201/145* (2013.01)

(58) Field of Classification Search
None
See application file for complete search history.

(56) References Cited

U.S. PATENT DOCUMENTS

| | | | |
|---|---|---|---|
| 4,817,000 | A | 3/1989 | Eberhardt |
| 4,954,962 | A | 9/1990 | Evans et al. |
| 5,040,116 | A | 8/1991 | Evans et al. |
| 5,530,330 | A | 6/1996 | Baiden et al. |
| 5,995,898 | A | 11/1999 | Tuttle |
| 6,163,745 | A | 12/2000 | Purchase et al. |

(Continued)

FOREIGN PATENT DOCUMENTS

CA          2739693 A1     11/2012

OTHER PUBLICATIONS

DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/http://www.dhl.com/content/dam/downloads/g0/about_us/logistics_insights/dhl_self_driving_vehicles.pdf), 39 pages.

(Continued)

*Primary Examiner* — Yolanda R Cumbess
(74) *Attorney, Agent, or Firm* — Athorus, PLLC

(57) ABSTRACT

A mobile base is provided that travels through delivery areas and utilizes associated transportation units (e.g., automated aerial vehicles) for delivering items from the mobile base to delivery locations. The transportation units may be carried on the mobile base, and may travel back and forth to the mobile base when making deliveries. The mobile base may include an extraction point (e.g., an opening in the roof of the mobile base) where items may be engaged by transportation units for delivery.

20 Claims, 18 Drawing Sheets

(56) References Cited

U.S. PATENT DOCUMENTS

| | | |
|---|---|---|
| 7,069,124 B1 | 6/2006 | Whittaker et al. |
| 7,339,993 B1 | 3/2008 | Brooks et al. |
| 7,673,831 B2 | 3/2010 | Steele et al. |
| 7,946,530 B1 | 5/2011 | Talmage |
| 8,205,822 B1 | 6/2012 | Jameson et al. |
| 8,511,606 B1 | 8/2013 | Lutke et al. |
| 8,899,903 B1* | 12/2014 | Saad .............. B65G 67/00 414/392 |
| 8,948,935 B1 | 2/2015 | Peeters et al. |
| 9,051,043 B1 | 6/2015 | Peeters et al. |
| 9,079,587 B1 | 7/2015 | Rupp et al. |
| 9,216,587 B2 | 12/2015 | Ando et al. |
| 9,216,857 B1 | 12/2015 | Kalyan et al. |
| 9,244,147 B1 | 1/2016 | Soundararajan et al. |
| 9,307,383 B1 | 4/2016 | Patrick |
| 9,336,506 B2 | 5/2016 | Shucker et al. |
| 9,381,916 B1 | 7/2016 | Zhu et al. |
| 9,481,256 B2 | 11/2016 | Arkus et al. |
| 9,704,409 B2 | 7/2017 | Prakash et al. |
| 9,798,995 B1 | 10/2017 | Soundararajan et al. |
| 2002/0156645 A1 | 10/2002 | Hansen |
| 2003/0141411 A1 | 7/2003 | Pandya et al. |
| 2009/0236470 A1 | 9/2009 | Goossen et al. |
| 2009/0314883 A1 | 12/2009 | Arlton et al. |
| 2010/0036599 A1 | 2/2010 | Froeberg et al. |
| 2011/0035149 A1 | 2/2011 | McAndrew et al. |
| 2011/0118907 A1 | 5/2011 | Elkins |
| 2011/0264311 A1 | 10/2011 | Lee et al. |
| 2011/0288696 A1 | 11/2011 | Lefebure |
| 2012/0056040 A1 | 3/2012 | Brotherton-Ratcliffe et al. |
| 2012/0150376 A1 | 6/2012 | Ash et al. |
| 2012/0296512 A1 | 11/2012 | Lee et al. |
| 2013/0081245 A1 | 4/2013 | Vavrina et al. |
| 2013/0342822 A1 | 12/2013 | Shiraishi |
| 2014/0022051 A1 | 1/2014 | Levien et al. |
| 2014/0022055 A1 | 1/2014 | Levien et al. |
| 2014/0032021 A1 | 1/2014 | Metzler et al. |
| 2014/0032034 A1 | 1/2014 | Raptopoulos et al. |
| 2014/0136414 A1 | 5/2014 | Abhyanker |
| 2014/0149244 A1 | 5/2014 | Abhyanker |
| 2014/0180914 A1 | 6/2014 | Abhyanker |
| 2014/0254896 A1 | 9/2014 | Zhou et al. |
| 2015/0006005 A1 | 1/2015 | Yu et al. |
| 2015/0069968 A1 | 3/2015 | Pounds |
| 2015/0102154 A1 | 4/2015 | Duncan et al. |
| 2015/0129716 A1 | 5/2015 | Yoffe |
| 2015/0153175 A1 | 6/2015 | Skaaksrud |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0246727 A1 | 9/2015 | Masticola et al. |
| 2015/0259078 A1 | 9/2015 | Filipovic et al. |
| 2015/0317597 A1 | 11/2015 | Shucker et al. |
| 2015/0332206 A1* | 11/2015 | Trew .............. G06Q 10/0836 705/330 |
| 2015/0367850 A1 | 12/2015 | Clarke et al. |
| 2015/0370251 A1* | 12/2015 | Siegel .............. G05D 1/0027 701/2 |
| 2016/0009413 A1 | 1/2016 | Lee et al. |
| 2016/0023778 A1 | 1/2016 | Zhao et al. |
| 2016/0033966 A1 | 2/2016 | Farris et al. |
| 2016/0068267 A1 | 3/2016 | Liu et al. |
| 2016/0104098 A1 | 4/2016 | Matula et al. |
| 2016/0144982 A1 | 5/2016 | Sugumaran |
| 2016/0159496 A1 | 6/2016 | O'Toole |
| 2016/0236778 A1 | 8/2016 | Takayama et al. |
| 2016/0299233 A1 | 10/2016 | Levien et al. |
| 2016/0334229 A1 | 11/2016 | Ross et al. |
| 2016/0371984 A1 | 12/2016 | MacFarlane et al. |
| 2017/0372256 A1 | 12/2017 | Kantor et al. |

OTHER PUBLICATIONS

DHL Trend Research, "Unmanned Aerial Vehicles in Logistics: A DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

Brian Straight, "Running Green: Amp charges into electric trucks, delivery drones," Fleet Owner, URL: https://www.fleetowner.com/running-green/amp-charges-electric-trucks-delivery-drones, originally posted Nov. 13, 2014, accessed on Feb. 22, 2019, 4 pages.

Posted by healthyfatboy, "Ground/Air Drone Delivery," DIY Drones: The Leading Community for Personal UAVs, URL: https://diydrones.com/profiles/blogs/ground-air-drone-delivery, originally posted on Aug. 26, 2014, accessed on Feb. 22, 2019, 6 pages.

Steve Banker, "Amazon and Drones—Here is Why It Will Work," URL: https://www.forbes.com/sites/stevebanker/2013/12/19/amazon-drones-here-is-why-it-will-work/#56cb21c35e7d, originally posted Dec. 19, 2013, accessed on Feb. 22, 2019, 5 pages.

Jniversity of Cincinnati, "Horsefly 'octocopter' primed to fly the future to your front door," EurekAlert! Science News, URL: https://www.eurekalert.org/pub_releases/2014-06/uoc-hp060514.php, Public Release Date: Jun. 5, 2014, accessed on Feb. 22, 2019, 4 pages.

* cited by examiner

MOBILE BASE UTILIZING AUTOMATED AERIAL VEHICLES FOR DELIVERING ITEMS

PRIORITY CLAIM

This application is a continuation of U.S. patent application Ser. No. 14/569,511, filed Dec. 12, 2014, entitled "Mobile Base Utilizing Transportation Units for Receiving Items," which is incorporated herein by reference in its entirety.

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by customers. This inventory may be maintained and processed at a building including a materials handling facility. Such materials handling facilities may include, but are not limited to, one or more of: warehouses, distribution centers, cross-docking facilities, order fulfillment facilities, packaging facilities, shipping facilities, or other facilities or combinations of facilities for performing one or more functions of material (inventory) handling.

Typically ordered items are packed in shipping packages (e.g., corrugated boxes) and shipped to the customer's residence or place of business. Physical delivery of items to user specified locations has improved dramatically over the years, with some retailers offering next day delivery of ordered items. The final, or last mile delivery of physical items to a user specified location, is traditionally accomplished using a human controlled truck, bicycle, cart, etc. For example, a user may order an item for delivery to their home. The item may be picked from a materials handling facility, packed and shipped to the customer for final delivery by a shipping carrier, such as the United States Postal Service, FedEx, or UPS. The shipping carrier will load the item onto a truck that is driven by a human to the final delivery location and the human driver, or another human companion with the driver, will retrieve the item from the truck and complete the delivery to the destination. For example, the human may hand the item to a recipient, place the item on the user's porch, store the item in a post office box, etc.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
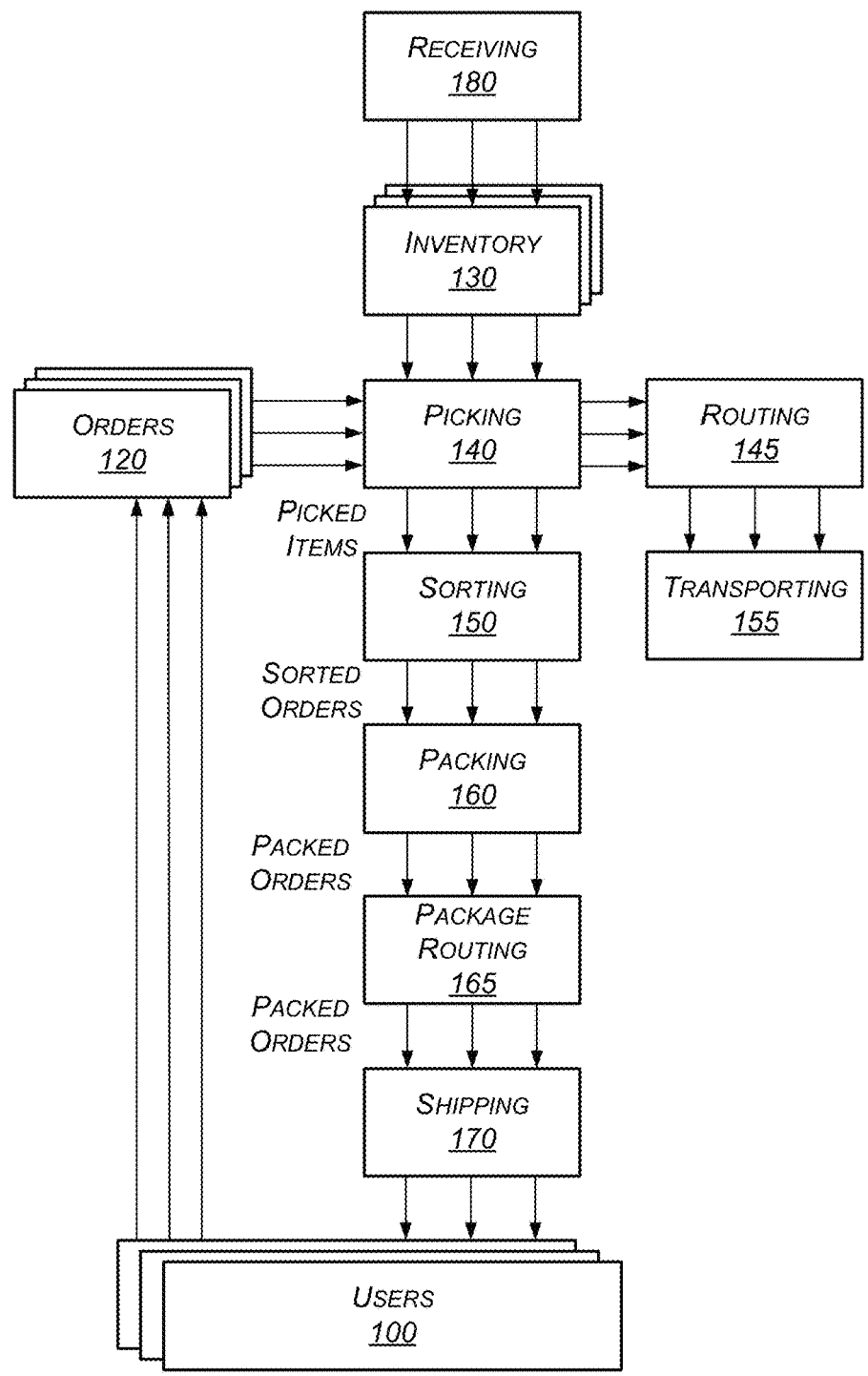
FIG. 1 illustrates a broad view of the operation of a materials handling facility, in one implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

This disclosure describes systems and methods for utilizing mobile bases. In various implementations, transportation units (e.g., automated aerial vehicles, bicycles, etc.) may be utilized for delivering items from a mobile base to user specified delivery locations. For example, the transportation units may be stationed on or travel to the mobile base as the mobile base travels through an area. In various implementations, the mobile base may include or otherwise be transported by a mobile machine (e.g., truck, automobile, aircraft, watercraft, etc.), and control of the mobile machine may be manual (e.g., a driver) or automated (e.g., directly or remotely controlled by an automated system, robotic, etc.).

In various implementations, the transportation units may be independent of the mobile base and may be associated with a specific geographic area where they are stationed. For example, an automated aerial vehicle may be stationed at a fixed geographic location, from which it may travel to a mobile base when the mobile base is in the area for making deliveries. In various implementations, such transportation units may also be utilized for other purposes (e.g., local deliveries) when a mobile base is not in the area.

In various implementations, a mobile base may travel to an area based on various mobile base positioning factors. For example, a temporal event (e.g., a football game) may be expected to produce a demand for certain types of items (e.g., sporting paraphernalia, food products, etc.). In various implementations, the mobile base may travel to an area near or at the temporal event. For example, one type of mobile base (e.g., a truck) may park or travel a route near the temporal event, or another type of mobile base (e.g., a blimp) may hover over the temporal event. Transportation units may then be utilized to deliver items from the mobile base to user specified delivery locations (e.g., to a tailgating event in a parking lot, to an individual inside a stadium, etc.).

In various implementations, a mobile base may include an automatic storage and retrieval system that may automatically present an item at a location where the item may be engaged by a transportation unit. For example, the mobile base may include an opening in a roof, side, etc. where the automatic storage and retrieval system may present an item to be engaged by the transportation unit. In various implementations, a transportation unit may be able to land on or otherwise engage an item on the mobile base even while the mobile base is in motion. For example, while a mobile base is traveling along a route, an automated aerial vehicle may be configured for landing on the roof of the mobile base and engaging or delivering an item without requiring the mobile base to stop.

In various implementations, multiple different types of transportation units may be utilized with a mobile base. For example, different types of transportation units may include automated aerial vehicles, bicycles, automobiles, mobile drive units, etc. When a delivery is to be made, a type of transportation unit may be selected for the delivery based on certain transportation factors. For example, one type of transportation unit may be preferable over another based on transportation factors such as current traffic conditions, weather, safety, travel speed, travel costs, etc.

In addition to previously ordered items, mobile bases may also be used to deliver high-volume and/or release day items. In various implementations, certain storage areas of a mobile base may be reserved for high-volume and/or release day items and/or any available storage areas that have not been filled with user orders may be utilized for the high-volume and/or release day items. For example, when a mobile base is ready to travel to a delivery area, any empty storage areas may be filled with high-volume and/or release day items in case those items are ordered by users. After the mobile base has traveled to the delivery area, if a user subsequently orders one of the high-volume and/or release day items, a transportation unit may be utilized to deliver the item.

In various implementations, mobile bases may be positioned relative to one another in an adjustable network in accordance with the relative routes and delivery areas to best meet anticipated demand. The anticipated demand may be related to factors such as a number of anticipated or scheduled delivery locations in a delivery area, an occurrence of a temporal event in a delivery area that is expected to create a demand for deliveries, etc. In various implementations, an optimization technique may be utilized for determining the relative positioning of each of the mobile bases. For example, estimated numbers of delivery locations in different delivery areas may be utilized to determine an optimal positioning of mobile bases in respective delivery areas to best meet the anticipated demand.

In various implementations, transportation units may be able to travel between various mobile bases in a network. For example, once a transportation unit completes a delivery, the transportation unit may return to a different mobile base (e.g., a closest mobile base) rather than the mobile base that the transportation unit originated from (e.g., which may have subsequently left the area). Transportation units may also stop at different mobile bases for resources (e.g., recharging, fueling, repairs, parts, etc.). Transportation units may also be utilized to transport items or supplies from one mobile base to another (e.g., if a mobile base runs out of high volume items, if a mobile base is in need of parts for repair or supplies for transportation units, etc.)

In various implementations, mobile bases and associated transportation units may also be utilized for receiving items (e.g., from merchants, vendors, returns of items from users, etc.). For receiving items, transportation units may travel to specified receiving locations. Such received items may be transported by the transportation units back to a mobile base, which may subsequently transport the items to a materials handling facility. Alternatively, the received items may be sold directly from the mobile base (e.g., for which transportation units may subsequently transport the items to user specified delivery locations). In various implementations, when an item is received by a transportation unit, a credit or other compensation may be issued for the item. For example, a merchant's account may be automatically credited for an item once it is received by a transportation unit. As part of the crediting process or as part of an alternative compensation process, payment for the item may also be made immediately from the transportation unit (e.g., the transportation unit may dispense cash, electronic payment, coupons, etc.). As another example, a refund or exchange process may be initiated for a user once an item for return is received by a transportation unit. Alternatively, such credits or other compensation may be issued after the item is transported by the transportation unit to the mobile base. In various implementations, an item may be recorded in an inventory database as available for sale once the item has either been engaged by the transportation unit or received at the mobile base. Such items may subsequently be sold directly from the mobile base or from a materials handling facility to which the mobile base transports the item.

In various implementations, a transportation unit from a mobile base may transport a received item to a different location rather than back to the mobile base from which the transportation unit originated. For example, a received item may be transported directly to a materials handling facility (e.g., if the materials handling facility is closer than the mobile base, if there is urgency for the materials handling facility to receive the item before the mobile base would arrive, etc.) As another example, a received item may be transported to a different mobile base (e.g., if the other mobile base is closer). As another example, a received item may be transported directly to a user specified delivery location.

A mobile base management system may be configured to communicate (e.g., wirelessly) with the mobile bases and/or transportation units. In various implementations, the general activities of the mobile bases and/or transportation units (e.g., related to the delivery and/or receiving of items, the travel to and from the designated delivery and/or receiving areas, etc.) may be coordinated by the mobile base management system. For example, the mobile base management system may receive or determine schedule data for the travel of the mobile bases to and from the designated areas that include the locations where the transportation units will deliver and/or receive the items. In various implementations, the mobile base management system may also receive tracking data (e.g., GPS) regarding the locations of the mobile bases and/or transportation units and use that data for various purposes (e.g., status monitoring, answering location status requests, sending notifications regarding the current location of the mobile bases and/or transportation units, etc.)

A block diagram of a materials handling facility which, in one implementation, may be an order fulfillment facility configured to utilize various systems and methods described herein (e.g., for providing or receiving items to or from mobile bases), is illustrated in FIG. 1. In this example, multiple users 100 may submit orders 120, where each order 120 specifies one or more items from inventory 130 to be shipped or otherwise delivered (e.g., by a mobile base) to the user or to another entity specified in the order. An order fulfillment facility typically includes a receiving operation 180 for receiving shipments of stock from various vendors (e.g., as may be transported by a mobile base) and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. The picking operation 140 may in various implementations be manual or automated (e.g., robotic). In some implementations, the items of a user order may be divided into multiple shipment sets for fulfillment by a planning service before fulfillment instructions are generated (not shown). As used herein, the term "shipment set" may refer to a single item of a user's order, multiple items of a user's order, or all items of a user's order.

In some instances, when a mobile base, such as the mobile base described below with respect to FIG. 2, has been designated for a delivery, the item(s) of one or more shipment sets may be picked at the picking operation 140 directly into storage areas (e.g., bins) of the mobile base. In some implementations, the storage areas of the mobile base may be permanently affixed within the mobile base. In other implementations, the mobile base may include removable components that may be filled with items in the materials handling facility and then placed in the mobile base. For example, as will be described in more detail below with respect to FIG. 2, a storage area of a mobile base may include a bay of bins, which may remain in the mobile base or may be removed and filled with items inside a materials handling facility, after which the bay of bins may be moved back into the mobile base for transport. Regardless of whether the storage areas of the mobile base are fixed or removable, it will be appreciated that by picking items directly into the storage areas of the mobile base, the items may not need to be packed in shipping packages. In addition, the packing slip typically included in a shipping package may be applied to the item (e.g., stickered to the item), printed out at the mobile base upon retrieval of the item, or otherwise made available to a user.

In various implementations, the storage areas of the mobile base may each include a unique identifier, such as a bar code, QR code, unique number, etc., to enable tracking, identification, and/or association of items placed in each of the storage areas. For example, during a picking operation, an agent or automated system (e.g., robotic) within the materials handling facility may scan the bar code of the storage area and/or scan a barcode or identifier of the picked item as the item is picked and/or placed into the storage area. Scanning of the storage area and/or the picked item may be utilized to associate and track the item with the storage area and the mobile base. As storage areas of mobile bases are filled, a routing operation 145 may route the filled storage areas and/or mobile bases to an appropriate transporting operation 155 from which the mobile base may travel to a designated delivery area, as will be described in more detail below with respect to FIG. 4.

In other examples, a mobile base (e.g., including a truck) may be made to hold or otherwise transport one or more delivery containers, in which case the item(s) of one or more shipment sets may be picked at the picking operation 140 directly into delivery containers. A "delivery container," as used herein, may be any form of container used in transporting or handling items. For example, a delivery container may be a tote, pallet, bin, trailer, etc. Additionally, the delivery container may be segmented or otherwise include division points, permanent or movable, that enable separation of items within the delivery container. In some instances, items themselves, such as larger items (e.g., big screen televisions, desks, cabinets) may be considered and treated as delivery containers. The delivery container may also include a unique identifier, such as a bar code, QR code, unique number, etc., to enable tracking and identification of the delivery container and association of items placed into the delivery container. For example, during a picking operation, an agent within the materials handling facility may scan the bar code of the delivery container and scan a barcode or identifier of the picked item as the item is placed into the delivery container. Scanning of the delivery container and the picked item results in the item becoming associated with and tracked with the delivery container. In some implementations, for delivery containers that are segmented or otherwise include division points, those segments may each include a unique identifier (e.g., bar code) and as items are placed in the delivery container they may be associated with a specific location, or segment within the delivery container by scanning the identifier of that segment. Likewise, because items may not be packed in shipping packages, the packing slip typically included in a shipping package may be applied to the item (e.g., stickered to the item), printed out at the mobile base to be transported with the item when it is delivered, or otherwise made available to a user.

Regardless of the type of delivery container utilized, in some implementations, some types of items can be transported in the delivery container without needing to be packed in a shipping package inside the delivery container. In other instances, items that are either pre-packaged, fragile, or need additional protection prior to transport may be picked and packed in a shipping package. In another implementation, items may be put into bags prior to placement in the delivery container and/or storage areas to provide confidentiality of the ordered items. In addition, items from multiple shipment sets to be transported by the same mobile base may be picked into the same delivery container for transport. As delivery containers are filled, a routing operation 145 may route the filled delivery containers to the appropriate transporting operation 155 for placement in a designated mobile base. The routing operation 145 may be manual or automated. The routing operation 145 may receive an indication of the mobile base to which each item should be routed from a shipment planning system and route delivery containers to one of two or more transporting operations 155, from which they may be placed in a designated mobile base.

In other examples, some picked items may be delivered to one or more stations in the order fulfillment facility for sorting 150 into their respective shipment sets and for packing 160 in shipping packages. A package routing operation 165 may sort orders for packing in shipping packages to one of two or more shipping operations 170, from which they may be shipped to the users 100. In various implementations, mobile bases may be utilized for the shipping and may be considered as an alternative to shipping by traditional carriers. The package routing operation 165 may, depending on the specific implementation, be either automated or manual. The package routing operation 165 may receive an indication of the destination to which each packed shipment set should be routed from a central control system. In some instances, the destination may be the final destination identified by the user or a destination at which transfer of a shipment set may occur for final delivery to the user. The package routing operation 165 may also determine a routing destination for each packed shipment set dependent on the size of a shipping package in which the shipment set is contained and/or based on whether the shipment set will be delivered by a traditional carrier or a mobile base.

The arrangement and order of operations illustrated by FIG. 1 is merely one example of many possible implementations of the operation of a materials handling facility, such as an order fulfillment facility, that enables filling of storage areas of mobile bases with items and subsequent travel to delivery areas (FIG. 4) and/or other fulfillment of user orders. Other types of materials handling, manufacturing, or order fulfillment facilities may include different, fewer, or additional operations and resources, according to different implementations.

Figure 2:
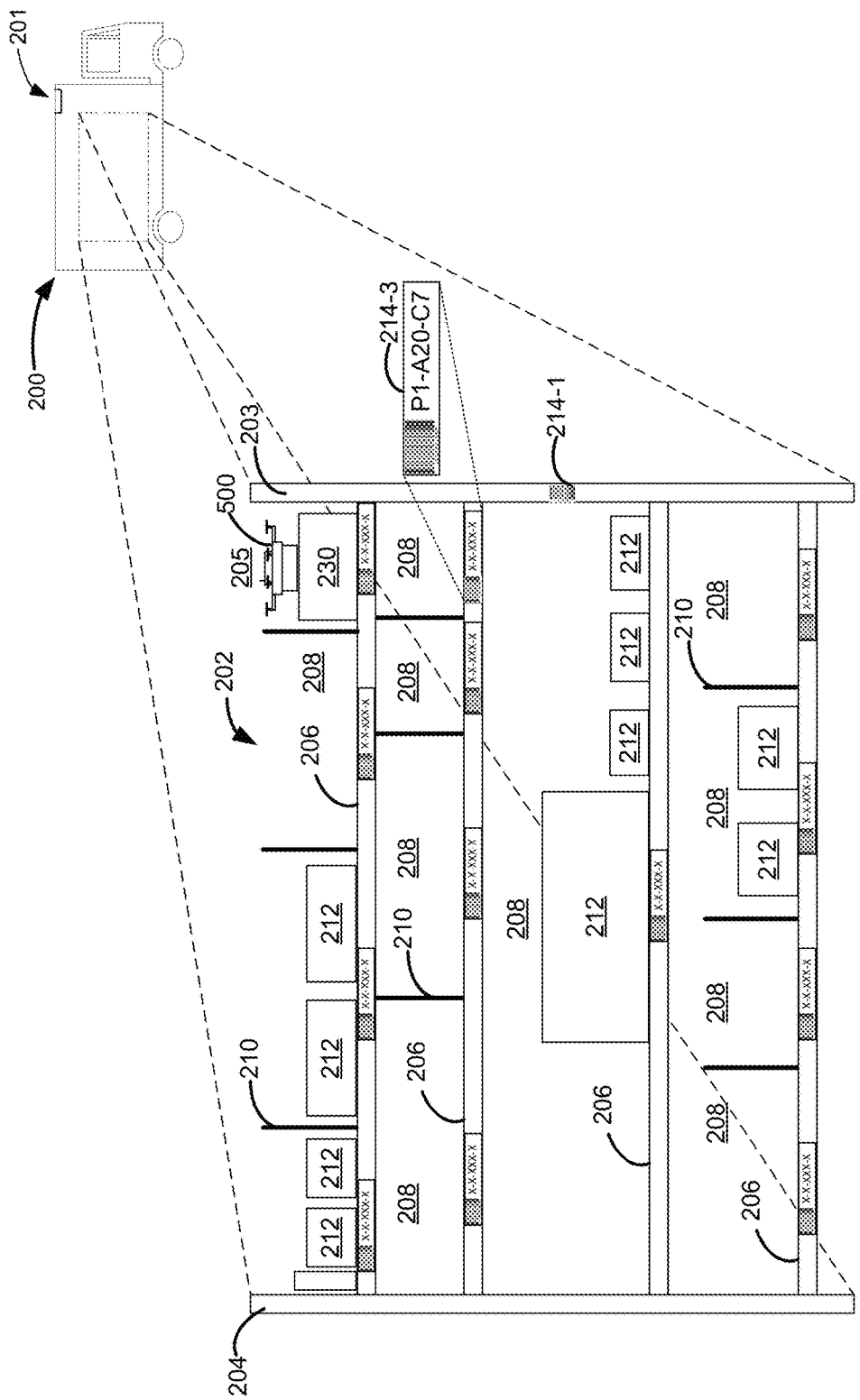
FIG. 2 depicts a block diagram of a mobile base, in one implementation.

FIG. 2 depicts a block diagram of a mobile base 200. In various implementations, the mobile base 200 may include or otherwise be transported by any type of mobile machine (e.g., truck, automobile, watercraft, aircraft, etc.). The control of the mobile machine may be manual (e.g., a driver) or automated (e.g., directly or remotely controlled by an automated system, robotic, etc.). The size of the mobile base 200 may vary and, for purposes of illustration with respect to the example of FIG. 2, may include several sections of storage areas (e.g., bins), varying numbers and/or sizes of storage areas, and/or additional features may be included depending on the specific implementation. The shape of the mobile base 200 may also vary, depending on the implementation. For example, the mobile base may be sized and shaped to be drivable on standard roads. The profile of the mobile base 200 may also be streamlined to reduce air resistance during travel. Weatherproofing techniques may be utilized to protect the functionality of the mobile base 200 and any operational components (e.g., extraction point openings for items) when the mobile base is subjected to weather conditions during travel.

Figure 3:
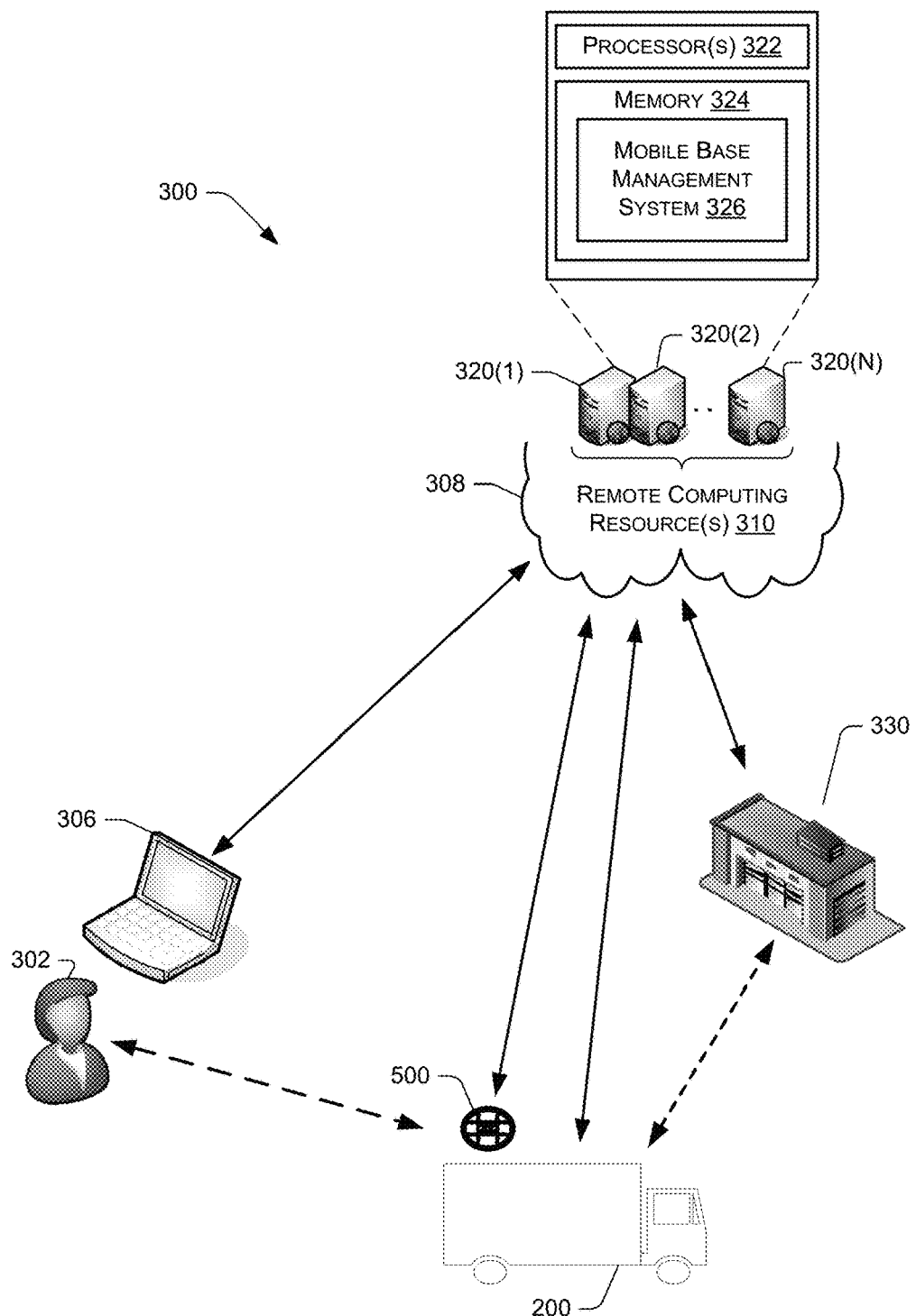
FIG. 3 depicts a block diagram of a mobile base environment, in one implementation.

The mobile base 200 may include one or more internal computing systems (not shown), that are capable of maintaining system information for each storage area (e.g., bin) of the mobile base 200 and providing other computing functions. For example, the internal computing system may include a command component that maintains information as to which storage areas of the mobile base 200 are empty, which storage areas include items, and any other information necessary to maintain the mobile base. The mobile base 200 may be configured to obtain information from a remote computing resource, shipment planning system, capacity planning system, materials handling facility, mobile base management system or may be configured to operate primarily as a stand-alone unit, with limited external communication to receive/provide order/delivery/transfer information. FIG. 3, described below, illustrates an example of an environment in which a centralized mobile base management system is provided for remotely communicating with a mobile base 200.

In the specific example of FIG. 2, the mobile base 200 is shown to include storage areas in the form of bins 208 within a bay 202. In various implementations, other configurations may be utilized for storage areas and organization of items in a mobile base (e.g., including different forms of shelving structures, bins with hanging baskets, storage containers, automatic storage and retrieval system configurations, etc.), and the configuration shown in FIG. 2 is intended to be illustrative only. In the example of FIG. 2, the bay 202 (which may be permanently installed or removable for filling/unloading at a materials handling facility), includes two ends 203 and 204. The bay 202 in this example includes four shelves 206. A bay may include any number of shelves or no shelves (e.g., the bay may just be a designated storage location within the mobile base 200). Likewise, as illustrated, the shelves 206 of the bay 202 may include any number of bins 208.

Bins 208 may be established using dividers 210 to provide a physical separation between two different sections of the bay. Alternatively, if a shelf does not include a divider, the entire shelf may be considered a bin. Likewise, if the bay does not include any shelves or dividers, the bay may be considered as a single bin. The dividers 210 may be any physical structure used to divide or otherwise separate a bay. For example, a divider 210 may be a metal or plastic divider that can be affixed to a shelf such that it is perpendicular to the shelf. Alternatively, the divider may be a piece of corrugate that is folded or placed on the shelf to divide or otherwise separate the shelf. Alternatively, dividers may be in the forms of sides of elements (e.g., hanging baskets), which may serve as bins. In various implementations, such configurations may be utilized in conjunction with an automatic storage and retrieval system with a robotic mechanism that moves back and forth relative to the bay and is able to select an item (or a container holding an item such as a hanging basket) for presentation at an extraction point (e.g., an opening 201 in a roof) of the mobile base 200. In various implementations, the bins may have raised outer edges, doors, covers, etc. to assist with maintaining stored items in the bins while the mobile base is in motion.

Items 212 of different sizes and/or shapes may be stored in the bins 208. In various implementations, a bin may include one or more items 212 of the same type and/or items of different types, shapes, and/or sizes. A group of items 212 in a bin is collectively referred to herein as the bin content or content of the bin. Agents may stow and/or pick items from the bins and, in some implementations, may move, add and/or remove dividers from the bays 202 thereby altering the configuration of the bay 202 by increasing and/or decreasing the number of bins 208.

In some implementations, the bay 202 may be identified by a visual identifier 214 located on the bay. The visual identifier 214 may be, for example, a barcode, bokode, QR code, color, shape, character, image, size, or any other identifier that can be used to identify the bay 202. In various implementations, a mobile base 200 may be large enough to accommodate multiple bays 202, in which case the visual identifiers 214 may be utilized to distinguish the bays from one another. In addition, in various implementations the bay 202 may be removable from the mobile base 200, such that it can be transported inside a materials handling facility for loading/unloading of items 212. Such bays 202 may be interchangeable, and a visual identifier 214 may be utilized for identifying which bays correspond to a particular mobile base 200.

Visual identifiers 214 may also be utilized to identify bins 208 within each bay 202. For example, visual identifiers 214-3 each represent a bin 208 within the bay 102. When bins 208 are added, removed, or adjusted, the corresponding visual identifiers 214 may be added, removed, and/or adjusted to correspond to the modified, added, and/or removed bin. In some implementations, the visual identifiers 214 may include multiple types of identification. For example, visual identifier 214-3 may include both a barcode and human-readable information, in this example P1-A20-C7, at least some of which may indicate a correspondence to the particular mobile base 200.

Information about the bin, such as the bin location, size, shape, weight capacity, inventory items, etc., may also and/or alternatively be maintained in a mobile base data store 309 accessible by a mobile base management system 326, as will be described in more detail below with respect to FIG. 18. When the visual identifier 214 is detected, it may be provided to the mobile base management system 326 and the information associated with the visual identifier 214 may be obtained.

While the examples discussed herein utilize visual identifiers and/or dividers to detect and/or obtain information about bays and bins, in other implementations other forms of identifiers may be utilized. For example, active identifiers, such as radio frequency identifier tags ("RFID") may be used to provide information about bins and/or bays. In such an implementation, an active identifier reader may be utilized to detect the presence of active identifiers and to obtain information associated with the visual identifiers. Generally, the active tag reader may utilize one or more wireless technologies (e.g., RFID, near field communication ("NFC"), Bluetooth, infrared) to detect active identifiers.

In various implementations, one or more designated areas 205 for one or more transportation units 500 (e.g., such as the automated aerial vehicle 500 that will be described in more detail below with respect to FIG. 5) may be provided inside or outside of the mobile base 200. For example, as shown in the example of FIG. 2, at least one designated area 205 may be provided on top of a bay 202, and may be accessible through an opening 201 in the roof of the mobile base 200. In one implementation, the designated area 205 may be included within its own designated bin, and may include a landing and/or recharging platform 230. The landing platform and/or other parts of the landing area 205 may include charging and/or communication port capabilities for the transportation unit 500, wherein the transportation unit 500 may have navigation capabilities for landing on and connecting to such charging and/or communication port facilities (e.g., including plugs, guide rails, inductive capabilities, etc.). A determination of when a transportation unit 500 should land for charging may be made by the transportation unit 500, the mobile base 200, remote computing resources 310, and/or a mobile base management system 326, as will be described in more detail below with respect to FIG. 3. The landing platform 230 may also provide a suitable separation and height for the landing area 205 so that the transportation unit 500 will not interfere with adjacent bins when it takes off or lands. In other implementations, such landing areas 205 may be provided on the roof of the mobile base 200, where transportation units may take off and land, even while the mobile base is in motion. The opening 201 in the roof of the mobile base 200 may serve as an extraction point for providing/receiving items to or from transportation units (e.g., as presented or received by an automatic storage and retrieval system). In addition, the transportation units themselves may travel or be presented through the opening 201 for moving inside and outside of the mobile base 200. In various implementations, one or more transportation units 500 may generally be carried by or travel with the mobile base 200 as it travels to various delivery areas. Different types of carrying/mounting configurations may be utilized for different types of transportation units (e.g., a bicycle rack for carrying bicycles, etc.).

In various implementations, in addition to utilizing transportation units for transporting items, the mobile base 200 may also be configured to perform other functions. For example, the mobile base 200 may include agents or otherwise be configured to automatically process user orders and/or returns, process items received from merchants or vendors, place items in shipping containers or otherwise prepare items for shipment, send items to other mobile bases or generally perform other functions that are traditionally done by a materials handling facility (e.g., a fulfillment center), except in a mobile capacity. In various implementations, the mobile base may also have capabilities for on-demand production of items. For example, books may be produced through an on-demand printing process within the mobile base. As another example, a three-dimensional printer may be utilized within the mobile base for producing items. Such items may be subsequently transported from the mobile base by transportation units (e.g., for delivery to user specified delivery locations).

FIG. 3 is a block diagram of an illustrative mobile base environment 300 that enables a user 302 to order an item that will be transported by a mobile base 200 to a delivery area. As will be described in more detail below, once a mobile base reaches a delivery area, a transportation unit 500 may be utilized to transport the item from the mobile base 200 to a user specified delivery location. The mobile base environment 300 includes a user interface that allows a user 302 to place an order for an item that will be transported by a mobile base 200 to a delivery area (e.g., as will be described in more detail below with respect to FIG. 4). The user interface may be a graphical user interface, an audio only interface, a multi-mode interface, or any other interface for interacting with the user 302. The user interface may be provided to the user 302 through any type of electronic device 306, such as a tablet, desktop, laptop, smart phone, personal digital assistant, netbook, etc. The user interface may be delivered to the electronic device 306 by one or more remote computing resources 310 that make up part or all of an electronic commerce shopping environment. In other embodiments, the user interface may be in direct communication between a user and an agent.

The remote computing resources 310 may form a portion of a network-accessible computing platform implemented as a computing infrastructure of processors, storage, software, data access, and other components that is maintained and accessible via a network 308. Services, such as e-commerce shopping services, offered by the remote computing resources 310 do not require that the user have knowledge of the physical location and configuration of the system that delivers the services. The electronic device 306 may communicatively couple to the remote computing resources 310 via the network 308 which may represent wired technologies (e.g., wires, USB, fiber optic cable, etc.), wireless technologies (e.g., RF, cellular, satellite, Bluetooth, etc.), and/or other connection technologies. The network 308 carries data between the electronic device 306 and the remote computing resources 310.

After receiving from a user 302 an order for an item that may be transported by a mobile base 200 to a delivery area, the electronic device 306 may send this information to the remote computing resources 310 over the network 308. As illustrated, the remote computing resources 310 may include one or more servers, such as servers 320(1), 320(2), . . . , 320(N). These servers 320(1)-(N) may be arranged in any number of ways, such as server farms, stacks, and the like that are commonly used in data centers. Furthermore, the servers 320(1)-(N) may include one or more processors 322 and memory 324 that may store a mobile base management system 326.

The mobile base management system 326 may be configured, for example, to perform order planning and filling of mobile bases with orders (e.g., at a materials handling facility 330) and/or scheduling of deliveries by transportation units 500 from mobile bases to user specified delivery locations. In fulfilling orders that may be transported by a mobile base, the materials handling facility 330 may fulfill orders using any of the processes discussed above with respect to FIG. 1. As noted above, in various implementations one or more mobile bases may also be configured to generally perform some or all of the functions that are traditionally done by a materials handling facility (e.g., a fulfillment center), except in a mobile capacity. In some instances, one or more larger mobile bases may also be utilized to transport or otherwise service smaller mobile bases that travel to and from the larger mobile base. As an example, in one instance the functions of the materials handling facility 330 in FIG. 3 may be implemented in a larger mobile base, for which one or more smaller mobile bases 200 and/or associated transportation units 500 may travel to and from the larger mobile base (e.g., for receiving and/or delivering items, for transportation by the larger mobile base, etc.).

The mobile base 200 and/or transportation units 500 may communicatively couple to the remote computing resources 310 via the network 308. For example, the communications to and from the mobile bases 200 and/or transportation units 500 may utilize wireless antennas of the mobile bases and transportation units. Communications may be to and from the command component of each of the mobile bases (as described above with respect to FIG. 2) and to a control system of each of the transportation units (as described below with respect to FIG. 6).

The mobile base management system 326 may also be configured, for example, to communicate with the mobile bases 200 and/or transportation units 500. In various implementations, the general activities of mobile bases and transportation units, including those related to the planning and implementation of the mobile bases receiving and transporting items, the travel of the mobile bases to and from the designated delivery and receiving areas and the delivery and receiving of items by the transportation units, may be coordinated and/or otherwise controlled by the mobile base management system 326. For example, the mobile base management system 326 may receive or determine schedule data for the travel of the mobile bases to the designated delivery and/or receiving areas (as will be described in more detail below with respect to FIGS. 8 and 14) and for the return of the mobile bases back to the materials handling facilities (as will be described in more detail below with respect to FIGS. 13 and 17) and/or may otherwise direct the travel of the mobile bases and/or the distribution and/or receiving of items by the transportation units. In various implementations, the mobile base management system 326 and/or mobile base 200 may send instructions to or otherwise control the transportation units 500 for delivering and/or receiving items, travelling between mobile bases, etc. As an example, instructions may be transmitted to a remotely stationed transportation unit that indicate a location where a mobile base may be met by the transportation unit for acquiring an item, as well as delivery instructions including a delivery location where the item is to be delivered by the transportation unit.

In various implementations, the remote computing resources 310 and/or mobile base management system 326 may also receive tracking data (e.g., GPS) regarding the coordinates of the mobile bases and/or transportation units. The GPS data may be utilized for various purposes, such as answering location status requests or for sending notifications regarding the current locations of the mobile bases and/or transportation units. For example, a user may request that a notification be sent when a mobile base or a transportation unit with an ordered item is approaching. As another example, a notification may be sent to a remotely stationed transportation unit when a mobile base is approaching a pickup location where the transportation unit is to meet the mobile base for acquiring an identified item from the mobile base. Notifications may also be sent from the mobile base 200 and/or transportation unit 500 to the remote computing resources 310 and/or mobile base management system 326 regarding various events (e.g., when a transportation unit has left the mobile base, when a transportation unit has delivered an item, when a transportation unit has returned to the mobile base, etc.).

Figure 4:
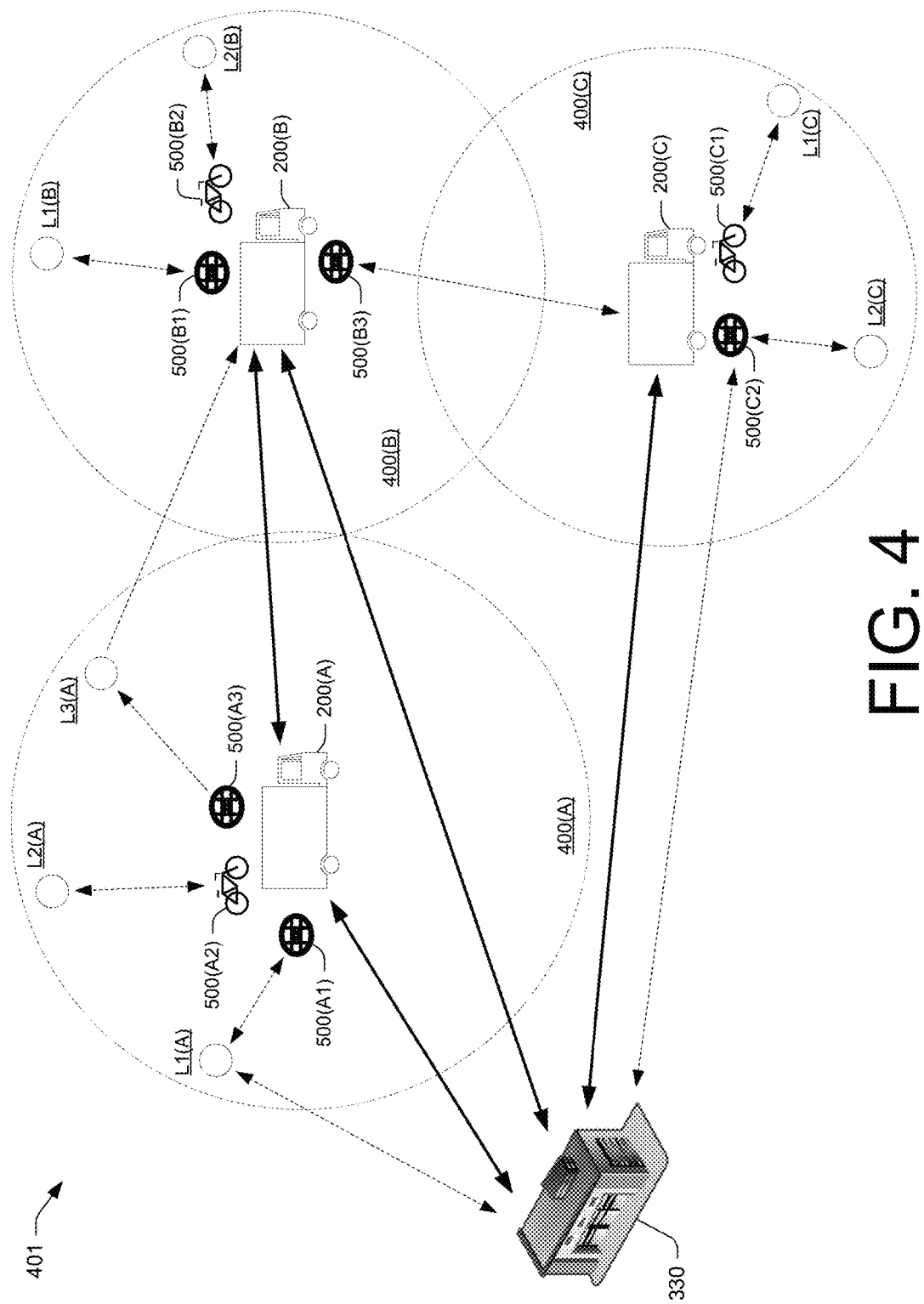
FIG. 4 depicts a block diagram of an adjustable network of mobile bases and different types of transportation units, in one implementation.

FIG. 4 depicts a block diagram of an adjustable network of mobile bases 200(A), 200(B), 200(C), in one implementation. In various implementations, the adjustable network of mobile bases may be part of a delivery system and/or a receiving system for delivering and/or receiving items, as will be described in more detail below. Corresponding geographic areas 400(A), 400(B), 400(C) are served by each mobile base 200(A), 200(B), 200(C), respectively. Each geographic area may include a number of locations (e.g., delivery locations and/or receiving locations). In certain examples that will be described below, the geographic areas 400(A), 400(B) and 400(C) may correspond to delivery areas and/or receiving areas, and locations L1(A)-L3(A), L1(B)-L2(B) and L1(C)-L2(C) within each of the respective geographic areas may correspond to delivery locations and/or receiving locations, depending on the specific example.

Each of the mobile bases 200(A)-200(C) is shown to have a number of corresponding transportation units of different types. As shown, the mobile base 200(A) has associated transportation units 500(A1) and 500(A3) (i.e., automated aerial vehicles) and a transportation unit 500(A2) (i.e., a bicycle). The mobile base 200(B) is shown to have associated transportation units 500(B1) and 500(B3) (i.e., automated aerial vehicles) and a transportation unit 500(B2) (i.e., a bicycle). The mobile base 200(C) is shown to have an associated transportation unit 500(C2) (i.e., an automated aerial vehicle) and a transportation unit 500(C1) (i.e., a bicycle).

In various implementations, the transportation units may be carried by, or travel with, the respective mobile bases as the mobile bases travel to and from delivery and/or receiving areas. Alternatively, some or all of the transportation units may be stationed at locations within the respective geographic areas, and may be utilized for transporting items to and from the mobile bases when the mobile bases are in the respective geographic areas. In various implementations, the transportation units that are stationed in the geographic areas may also be utilized for other purposes (e.g., transporting items for local pickups and deliveries) when the mobile bases are not in the geographic areas. In various implementations, the transportation units may receive instructions and/or be controlled or otherwise directed by the respective mobile bases and/or the mobile base management system. For example, the mobile base and/or the mobile base management system may send instructions to the transportation units to transport items from the mobile base to user specified delivery locations when the mobile base is within a delivery area that includes the user specified delivery locations.

In various implementations, a delivery or receiving area may generally be defined as any area that includes delivery or receiving locations. The areas may represent a travel range within a specified period of time for one or more types of transportation units from a stopping point or travel route of a mobile base. The example circular shapes of the geographic areas 400(A)-400(C) may represent example travel ranges of a type of transportation unit (e.g., an automated aerial vehicle) from a stopping point for a mobile base at the center of the circular area. In one implementation, a single delivery or receiving area may be represented by a combination of geographic areas. For example, the combination of geographic areas 400(A) and 400(B) may represent a single delivery or receiving area for a mobile base (e.g., wherein the mobile bases 200(A) and 200(B) may represent the same mobile base as it travels through the different areas). In various implementations, the combined geographic areas 400(A)-400(C) may represent a single delivery and/or receiving area that is serviced by the multiple mobile bases 200(A)-200(C) (e.g., as part of an adjustable network of mobile bases).

In operation, when an order for one or more items is placed by a user, a shipment set may be assigned to a materials handling facility 330 for fulfillment and delivery. An order planning system (e.g., as part of, or working in conjunction with, the mobile base management system 326) may determine if there is a mobile base, such as mobile base 200(A), that will be within a geographic area 400(A) which includes a delivery location L1(A) where the user may wish to have the items delivered on the desired date during a desired timeframe.

If an identified mobile base will be available, the mobile base management system 326 may determine if it is currently indicated that there will be available capacity for the user's order in the mobile base prior to designating the mobile base for transporting the order. For items that have been ordered with a mobile base 200(A) designated for transporting the order, the ordered items may be picked and placed into one or more storage areas (e.g., bins) of the mobile base 200(A) while the mobile base 200(A) is at the materials handling facility. Other items associated with other orders may also be picked and placed in the storage areas of the mobile base 200(A) while the mobile base 200(A) is located at the materials handling facility, after which the mobile base 200(A) may be instructed to travel to the designated geographic area 400(A).

In various implementations, in addition to previously designated user orders, mobile bases may also be used to deliver high-volume and/or release day items. A high-volume item may be, for example, an item that is frequently ordered, such as a popular book, shoe, video game, tablet, etc. A release day item may be an item that will become available on the day it is released to the public (e.g., book, movie, game, toy, etc.). For high-volume and/or release day items, they may be picked and placed in storage areas (e.g., bins) of various mobile bases before the mobile bases travel to designated delivery areas so that the items will be immediately available to be delivered by transportation units on the release day. In various implementations, certain storage areas of a mobile base may be reserved for high-volume and/or release day items and/or any available storage areas that have not been filled with user orders may be utilized for the high-volume and/or release day items. For example, when a mobile base is ready to be transported to a delivery area, any of the empty storage areas may be filled with high-volume and/or release day items in case those items are ordered by users. When a user orders one of the high-volume and/or release day items, a storage area containing one of those items may be associated with the user's order and the item made immediately available for delivery by a transportation unit.

As illustrated in FIG. 4, in one example the mobile base 200(A) is shown to initially travel from the materials handling facility 330 on a route that goes through the geographic area 400(A) (e.g., which in this instance may be designated as a delivery area). In various implementations, the mobile base 200(A) may have a single central stopping point within the geographic area 400(A), which all of the transportation units depart and return to, before the mobile base 200(A) continues to travel. Alternatively, the mobile base 200(A) may have multiple stopping points and/or may continue to move along the route through the geographic area 400(A) while the transportation units depart from and return to the mobile base 200(A) at different locations along the route.

The availability of different types of transportation units (e.g., the bicycle transportation unit 500(A2) as compared to the automated aerial vehicle transportation units 500(A1) and 500(A3)) indicates that when an item is to be delivered, a selection may be made between the different types of transportation units for transporting the item. As will be described in more detail below with respect to FIGS. 9 and 10, when a delivery is to be made, a transportation unit may be selected for the delivery based on certain transportation factors. For example, one type of transportation unit may be preferable over another based on transportation factors such as current traffic conditions, weather, safety, travel speed, travel cost, etc.

As another illustrative example, the transportation unit 500(A1) is shown to deliver an item from the mobile base 200(A) to a delivery location L1(A). As indicated by the dotted lined travel path, the transportation unit 500(A1) may then travel from the delivery location L1(A) to the materials handling facility 330, rather than back to the mobile base 200(A). This type of travel path may be followed for a number of reasons (e.g., the mobile base 200(A) may have subsequently left the geographic area 400(A) in which case the materials handling facility 330 may be closer to the current location of the transportation unit 500(A1), the transportation unit 500(A1) may have an item that is to be delivered to the materials handling facility 330, the mobile base 200(A) may have already returned to the materials handling facility 330, etc.). In an alternative implementation, the travel path may indicate that the transportation unit 500(A1) has traveled from the materials handling facility 330 to deliver an item to the delivery location L1(A), and then traveled to the mobile base 200(A). For example, the transportation unit 500(A1) may have delivered an item directly from the materials handling facility 330 to the delivery location L1(A), and then traveled to land on the mobile base 200(A) (e.g. which may be the closest mobile base) for further transport.

As another illustrative example, the transportation unit 500(A2) is shown to travel to a delivery location L2(A) to deliver an item from the mobile base 200(A), and then travel back to the mobile base 200(A). The transportation unit 500(A3) is shown to travel to a delivery location L3(A) to deliver an item from the mobile base 200(A), and then subsequently travel to a different mobile base 200(B). Such a travel route may be followed by a transportation unit for a number of reasons (e.g., the mobile base 200(A) may have subsequently left the area and the mobile base 200(B) may be closer, the transportation unit 500(A2) may have an item that is to be delivered to the mobile base 200(B), etc.). In various implementations, the mobile bases 200(A) and 200(B) may be representative of the same mobile base as it travels from the geographic area 400(A) to the geographic area 400(B), in which case the transportation unit 500(A3) may be described as returning to the mobile base that it originated from after the mobile base has moved to a different location.

With respect to the mobile base 200(B), the transportation units 500(B1) and 500(B2) are shown to deliver items from the mobile base to delivery locations L1(B) and L2(B), respectively, and then return to the mobile base 200(B). The transportation unit 500(B3) is shown to travel directly from the mobile base 200(B) to a mobile base 200(C). In various implementations, a transportation unit may travel between mobile bases for various reasons (e.g., to deliver or receive items or supplies from one mobile base to another, to be transported by a different mobile base back to a materials handling facility or other destination, to return to a mobile base that the transportation unit was originally assigned to, as following instructions to return after delivering an item to whichever mobile base is closest, etc.). In various implementations, transportation units may generally receive resources from mobile bases (e.g., electricity, fuel, water, parts, etc.) and a transportation unit may travel to a different mobile base for receiving such resources if the other mobile base is closer or otherwise more convenient, or if the original mobile base has run out of such resources, etc.

With respect to the mobile base 200(C), the transportation units 500(C1) and 500(C2) are shown to deliver items from the mobile base 200(C) to delivery locations L1(C) and L2(C), respectively, and to return to the mobile base. Additionally, the transportation unit 500(C2) is illustrated as traveling to and from the materials handling facility 330. In various implementations, a transportation unit may travel between a mobile base and a materials handling facility for a variety of reasons (e.g., to transport items from the mobile base to the materials handling facility, to receive needed items or supplies from the materials handling facility, etc.). As another example, if the mobile base 200(C) is travelling to transport received items to the materials handling facility 330, but a determination is made that subsequent travel of the mobile base 200(C) to the materials handling facility 330 is inhibited, instructions may be sent directing one or more transportation units (e.g., transportation unit 500(C2)) to travel ahead of the mobile base 200(C) to transport items to the materials handling facility 330.

In various implementations, in a geographic area with an increasing or decreasing volume of deliveries or receiving of items, the mobile base management system 326 may correspondingly increase or decrease the frequency or number of mobile bases that travel through the geographic area. The mobile base management system 326 may also monitor the patterns of deliveries or receiving of items over time and may adjust the schedules for the mobile bases to better meet the corresponding demand for delivering and/or receiving items. The locations that the mobile bases travel to and/or stop at for sending out transportation units to make deliveries and/or receive items may also be adjusted to optimize the network.

As noted above, a mobile base may travel to a first geographic area, such as geographic area 400(A), before traveling to a second geographic area, such as geographic area 400(B). In such an instance, the mobile bases 200(A) and 200(B) may be representative of the same mobile base as it travels to the different respective geographic areas. In one implementation, as described above, the first and second geographic areas 400(A) and 400(B) may each represent delivery areas where ordered items may be delivered by the respective transportation units to user specified delivery locations. In one example, the geographic areas 400(A) and 400(B) may have been predetermined and/or otherwise be on a regular route for the mobile base. As another example, the mobile base may have initially been instructed to travel to the geographic area 400(A) based on a mobile base positioning factor (e.g., based on a number of scheduled deliveries to the locations L1(A)-L3(A)), and then may be instructed to move to the different geographic area 400(B) due to a change in the mobile base positioning factor (e.g., newly scheduled or anticipated deliveries for the locations L1(B) and L2(B)).

In another implementation, the first geographic area 400(A) may represent a receiving area where the mobile base receives items (e.g., from merchants, vendors, etc.), after which the mobile base may travel to the geographic area 400(B) which represents a delivery area where the received items may be delivered by transportation units to user specified delivery locations. In various implementations, a given geographic area may also represent both a delivery area and a receiving area, wherein delivery locations and receiving locations may be included within the same geographic area. For example, the geographic area 400(A) may represent a receiving area that includes receiving locations L1(A) and L2(A), and may also represent a delivery area that includes a delivery location L3(A).

In various implementations, an item received at a receiving location by a transportation unit may be delivered directly to a user specified delivery location by the transportation unit rather than back to the mobile base. For example, instructions may be provided that an item received by a transportation unit from a receiving location L2(A) should be delivered directly to a user specified delivery location L3(A) rather than back to the mobile base 200(A). In various implementations, a transportation unit may receive multiple items from different receiving locations (e.g., locations L1(A) and L2(A)) before delivering the multiple items to one or more mobile bases (e.g., mobile base 200(A)) or delivery locations (e.g., location L3(A)). Similarly, a transportation unit may receive multiple items from a single mobile base (e.g., mobile base 200(A)) or receiving location (e.g., location L1(A)), and then travel to deliver the items to multiple delivery locations (e.g., locations L2(A) and L3(A)). In various implementations, multiple transportation units and/or mobile bases may be utilized for delivering different parts or items of a single user order (e.g., one item from a user order may be transported by a transportation unit 500(A1) while another item from the user order may be transported by a transportation unit 500(A2)).

Several of the examples described above regarding deliveries to delivery locations may alternatively be described for receiving items from receiving locations. For example, the transportation unit 500(A1) may have originated at the mobile base 200(A) and traveled to a receiving location L1(A) for receiving an item which the transportation unit 500(A1) subsequently transported to the materials handling facility 330. Alternatively, the transportation unit 500(A1) may have originated at the materials handling facility 330 and traveled to the receiving location L1(A) for receiving the item and subsequently transported the received item to the mobile base 200(A). As a similar example, the transportation unit 500(A3) may have originated at the mobile base 200(A) and traveled to a receiving location L3(A) for receiving an item and subsequently transported the received item to the mobile base 200(B) (which as described above may be a different mobile base or may be the same mobile base 200(A) as having traveled from the geographic area 400(A) to the geographic area 400(B)). In either case, as part of transporting the item to the mobile base 200(B), the transportation unit 500(A3) may subsequently land on or otherwise be engaged by the mobile base 200(B) for subsequently travelling with the mobile base.

In various implementations, a mobile base may itself travel to delivery locations and/or receiving locations for delivery and/or receiving of items. For example, in one implementation the mobile base 200(A) may travel to the receiving location L3(A) to receive items, and then may travel to the geographic area 400(B) where the items will be delivered by transportation units 500(B1) and 500(B2) to delivery locations L1(B) and L2(B). Alternatively or in addition, the mobile base 200(A) may receive items as transported by transportation units 500(A1) and 500(A2) from receiving locations L1(A) and L2(A), and then may travel to the delivery location L1(B) where the mobile base may deliver the items. In various implementations, the materials handling facility 330 may also be designated as a delivery and/or receiving location that mobile bases and/or transportation units may travel to and from for delivering and/or receiving items.

In various implementations, the receiving locations may also represent locations for receiving an item that is to be returned by a user. For example, when a user wishes to return an item, the user may schedule a receiving location (e.g., at or near the user's residence or place of work), where the item may be received by a transportation unit and subsequently transported back to a mobile base. In another implementation, a user may request that a transportation unit be utilized to deliver an item to a user specified delivery location, and then wait for the user to determine whether the user wishes to keep the item. For example, a user may have a pair of shoes delivered by a transportation unit, and then determine that the shoes are the wrong size or color, for which the user may wish to have the transportation unit subsequently transport the shoes back to the mobile base for a return. In another implementation, a return may be expected as part of a delivery process for an item. For example, when an item is delivered, the transportation unit that delivered the item may be utilized for certain types of returns (e.g., returning a defective or worn-out item in exchange for the new item that has been delivered, returning packaging that was utilized for protecting the item during delivery but which is no longer needed, etc.).

As will be described in more detail below with respect to FIG. 16, when a user returns an item, a credit or other compensation may be issued for the received item that may initiate a refund or replacement process, once the item is received by a transportation unit or a mobile base. Similarly, merchants or vendors may have a credit issued or receive other compensation for an item once the item is received by a transportation unit or at the mobile base. It will be appreciated that by issuing credits or other compensation for received items when they are received by a transportation unit or mobile base, refunds, payments, etc. may be initiated more quickly (e.g., as compared to traditional systems where an item would need to be received at a materials handling facility before a credit for the item would be issued).

Figure 5:
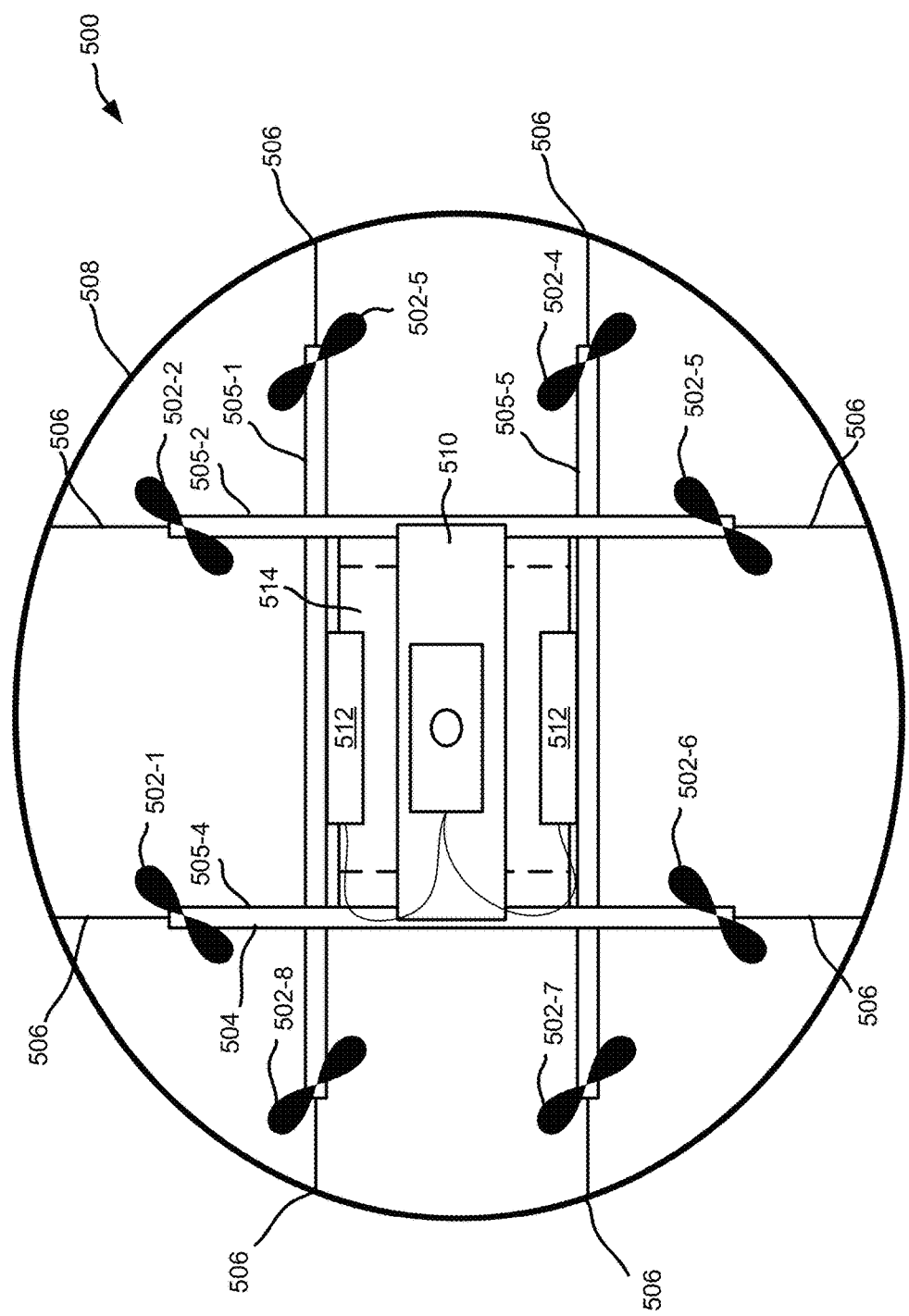
FIG. 5 depicts a block diagram of a top-down view of a transportation unit, in one implementation.

FIG. 5 illustrates a block diagram of a top-down view of a transportation unit 500 in the form of an automated aerial vehicle (also referred to herein as an "AAV"), according to an implementation. As illustrated, the transportation unit 500 includes eight propellers 502-1, 502-2, 502-3, 502-4, 502-5, 502-6, 502-7, 502-8 spaced about the frame 504 of the transportation unit. The propellers 502 may be any form of propeller (e.g., graphite, carbon fiber) and of a size sufficient to lift the transportation unit 500 and any item engaged by the transportation unit 500 so that the transportation unit 500 can navigate through the air, for example, to deliver an item to or from a mobile base 200. While this example includes eight propellers, in other implementations, more or fewer propellers may be utilized. Likewise, in some implementations, the propellers may be positioned at different locations on the transportation unit 500. In addition, alternative methods of propulsion may be utilized. For example, fans, jets, turbojets, turbo fans, jet engines, and the like may be used to propel the transportation unit.

The frame 504 or body of the transportation unit 500 may likewise be of any suitable material, such as graphite, carbon fiber, and/or aluminum. In this example, the frame 504 of the transportation unit 500 includes four rigid members 505-1, 505-2, 505-3, 505-4, or beams arranged in a hash pattern with the rigid members intersecting and joined at approximately perpendicular angles. In this example, rigid members 505-1 and 505-3 are arranged parallel to one another and are approximately the same length. Rigid members 505-2 and 505-4 are arranged parallel to one another, yet perpendicular to rigid members 505-1 and 505-3. Rigid members 505-2 and 505-4 are approximately the same length. In some embodiments, all of the rigid members 505 may be of approximately the same length, while in other implementations, some or all of the rigid members may be of different lengths. Likewise, the spacing between the two sets of rigid members may be approximately the same or different.

While the implementation illustrated in FIG. 5 includes four rigid members 505 that are joined to form the frame 504, in other implementations, there may be fewer or more components to the frame 504. For example, rather than four rigid members, in other implementations, the frame 504 of the transportation unit 500 may be configured to include six rigid members. In such an example, two of the rigid members 505-2, 505-4 may be positioned parallel to one another. Rigid members 505-1, 505-3 and two additional rigid members on either side of rigid members 505-1, 505-3 may all be positioned parallel to one another and perpendicular to rigid members 505-2, 505-4. With additional rigid members, additional cavities with rigid members on all four sides may be formed by the frame 504. As discussed further below, a cavity within the frame 504 may be configured to include an item engagement mechanism for the engagement, transport, and delivery of item(s) and/or containers that contain item(s).

In some implementations, the transportation unit may be configured for aerodynamics. For example, an aerodynamic housing may be included on the transportation unit that encloses the transportation unit control system 510, one or more of the rigid members 505, the frame 504, and/or other components of the transportation unit 500. The housing may be made of any suitable material(s) such as graphite, carbon fiber, aluminum, etc. Likewise, in some implementations, the location and/or the shape of the item engagement mechanism and/or any items or containers may be aerodynamically designed. As will be described in more detail below, in some instances a container may be utilized for holding an item, wherein the item engagement mechanism engages the item by engaging the container. For example, specially shaped containers for use with the transportation unit 500 may be aerodynamically designed and provided in the mobile base 200, such that an agent or automated system is able to select one of the containers and place the item in the container for engagement by the transportation unit 500. In some implementations, the item engagement mechanism may be configured such that when an item and/or container is engaged it is enclosed within the frame and/or housing of the transportation unit 500 so that no additional drag is created during transport of the item. In other implementations, the item and/or container may be shaped to reduce drag and provide a more aerodynamic design. For example, if a portion of a container extends below the transportation unit when engaged, the exposed portion of the container may have a curved shape.

The propellers 502 and corresponding propeller motors are positioned at both ends of each rigid member 505. The propeller motors may be any form of motor capable of generating enough speed with the propellers to lift the transportation unit 500 and any engaged item thereby enabling aerial transport of the item. For example, the propeller motors may each be a FX-4006-13 740 kv multi rotor motor.

Extending outward from each rigid member is a support arm 506 that is connected to a safety barrier 508. In this example, the safety barrier is positioned around and attached to the transportation unit 500 in such a manner that the motors and propellers 502 are within the perimeter of the safety barrier 508. The safety barrier may be plastic, rubber, etc. Likewise, depending on the length of the support arms 506 and/or the length, number or positioning of the rigid members 505, the safety barrier may be round, oval, or any other shape.

Mounted to the frame 504 is the transportation unit control system 510. In this example, the transportation unit control system 510 is mounted in the middle and on top of the frame 504. The transportation unit control system 510, as discussed in further detail below with respect to FIG. 6, controls the operation, routing, navigation, communication, object sense and avoid, and the item engagement mechanism of the transportation unit 500.

The transportation unit 500 also includes one or more power modules 512. In this example, the transportation unit 500 includes two power modules 512 that are removably mounted to the frame 504. The power module for the transportation unit may be in the form of battery power, solar power, gas power, super capacitor, fuel cell, alternative power generation source, or a combination thereof. For example, the power modules 512 may each be a 6000 mAh lithium-ion polymer battery, polymer lithium ion (Li-poly, Li-Pol, LiPo, LIP, PLI, or Lip) battery. The power module(s) 512 are coupled to and provide power for the transportation unit control system 510 and the propeller motors. In some implementations, one or more of the power modules may be configured such that it can be autonomously removed and/or replaced with another power module while the transportation unit is landed (e.g., such power modules may be provided by the mobile base 200). In some implementations, when the transportation unit lands at a designated location (e.g., on the mobile base), the transportation unit may engage with a charging member at the location that will recharge the power module.

As mentioned above, the transportation unit 500 may also include an item engagement mechanism 514. The item engagement mechanism may be configured to engage and disengage items and/or containers that hold items. In this example, the item engagement mechanism 514 is positioned within a cavity of the frame 504 that is formed by the intersections of the rigid members 505. The item engagement mechanism may be positioned beneath the transportation unit control system 510. In implementations with additional rigid members, the transportation unit may include additional item engagement mechanisms and/or the item engagement mechanism 514 may be positioned in a different cavity within the frame 504. The item engagement mechanism may be of any size sufficient to securely engage and disengage items and/or containers that contain items. In other implementations, the engagement mechanism may operate as the container, containing the item(s) to be delivered. The item engagement mechanism communicates with (via wired or wireless communication) and is controlled by the transportation unit control system 510.

While the implementations of the transportation unit discussed herein utilize propellers to achieve and maintain flight, in other implementations, the transportation unit may be configured in other manners. In one implementation, the transportation unit may include fixed wings and/or a combination of both propellers and fixed wings. For example, the transportation unit may utilize one or more propellers to enable takeoff and landing and a fixed wing configuration or a combination wing and propeller configuration to sustain flight while the transportation unit is airborne.

As will be described in more detail below with respect to FIG. 6, the transportation unit control system 510 may operate in conjunction with or may otherwise utilize or communicate (e.g., via wired and/or wireless communication) with one or more components of the mobile base management system 326 and/or the mobile base 200. Likewise, components of the mobile base management system 326 and/or the mobile base 200 may generally interact and communicate with the transportation unit control system 510.

Figure 6:
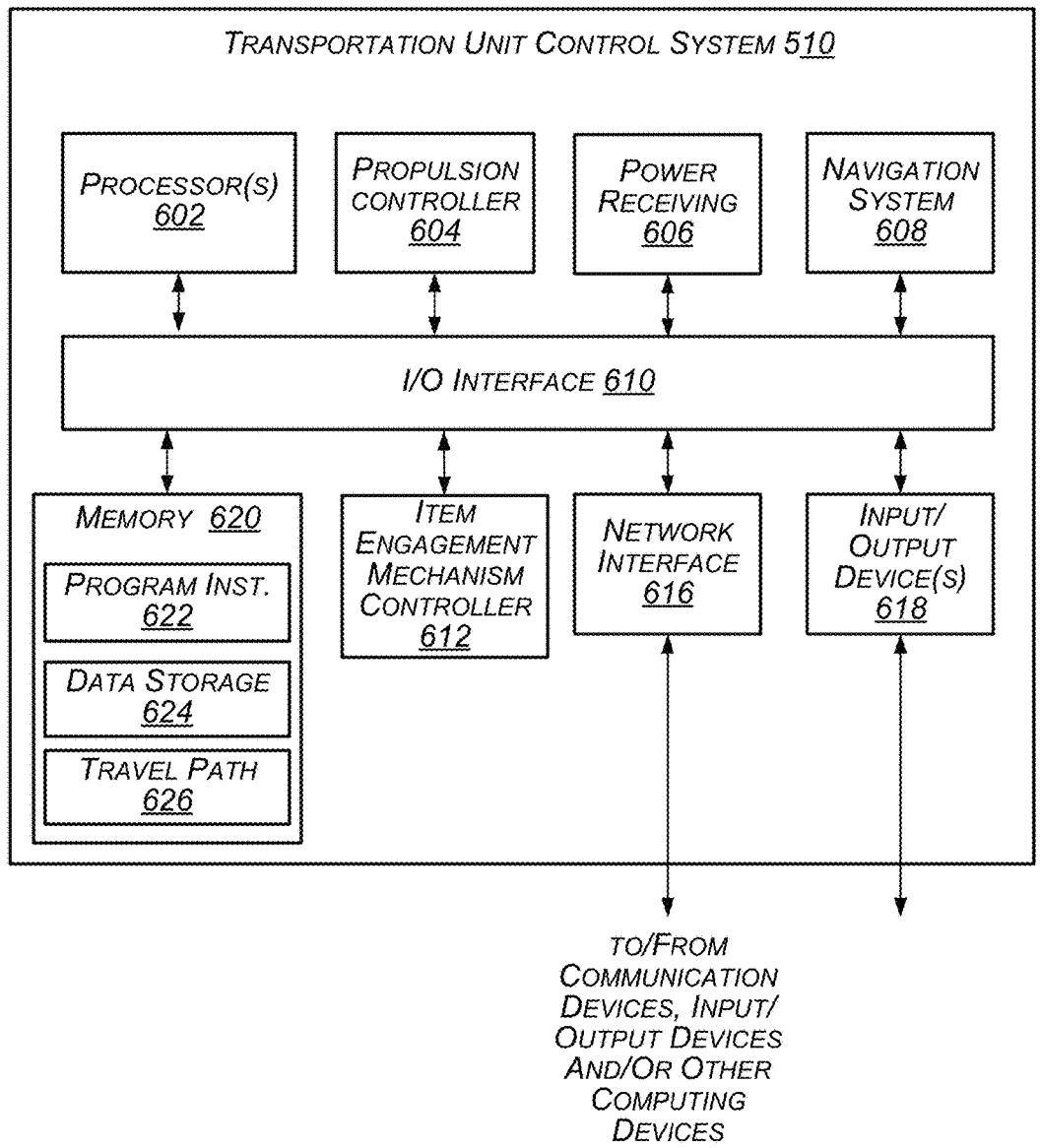
FIG. 6 depicts a block diagram illustrating various components of a transportation unit control system, in one implementation.

FIG. 6 is a block diagram illustrating an example transportation unit control system 510, such as may be utilized for the transportation unit 500 of FIG. 5, or for other types of transportation units. With respect to other types of transportation units, as one example the transportation unit control system 510 may be at least partially included in a communication device (e.g., a cell phone carried by a rider of a transportation unit such as a bicycle). In various examples, the block diagram of FIG. 5 may be illustrative of one or more aspects of the transportation unit control system 510 that may be used to implement the various systems and methods discussed herein. In the illustrated implementation, the transportation unit control system 510 includes one or more processors 602, coupled to a non-transitory computer readable storage medium 620 via an input/output (I/O) interface 610. The transportation unit control system 510 may also include a propulsion controller 604 (e.g., for controlling one or more motors, engines, etc.), a power supply module 606 and/or a navigation system 608. The transportation unit control system 510 further includes an item engagement mechanism controller 612, a network interface 616, and one or more input/output devices 618.

In various implementations, the transportation unit control system 510 may be a uniprocessor system including one processor 602, or a multiprocessor system including several processors 602 (e.g., two, four, eight, or another suitable number). The processor(s) 602 may be any suitable processor capable of executing instructions. For example, in various implementations, the processor(s) 602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions, data, travel paths, and/or data items accessible by the processor(s) 602. In various implementations, the non-transitory computer readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 620 as program instructions 622, data storage 624 and travel path data 626, respectively. In other implementations, program instructions, data, and/or travel paths may be received, sent, or stored upon different types of computer-accessible media, such as non-transitory media, or on similar media separate from the non-transitory computer readable storage medium 620 or the transportation unit control system 510. Generally speaking, a non-transitory, computer readable storage medium may include storage media or memory media such as magnetic or optical media, e.g., disk or CD/DVD-ROM, coupled to the transportation unit control system 510 via the I/O interface 610. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 616.

In one implementation, the I/O interface 610 may be configured to coordinate I/O traffic between the processor(s) 602, the non-transitory computer readable storage medium 620, and any peripheral devices, the network interface or other peripheral interfaces, such as input/output devices 618. In some implementations, the I/O interface 610 may perform any necessary protocol, timing or other data transformations to convert data signals from one component (e.g., non-transitory computer readable storage medium 620) into a format suitable for use by another component (e.g., processor(s) 602). In some implementations, the I/O interface 610 may include support for devices attached through various types of peripheral buses, such as a variant of the Peripheral Component Interconnect (PCI) bus standard or the Universal Serial Bus (USB) standard, for example. In some implementations, the function of the I/O interface 610 may be split into two or more separate components, such as a north bridge and a south bridge, for example. Additionally, in some implementations, some or all of the functionality of the I/O interface 610, such as an interface to the non-transitory computer readable storage medium 620, may be incorporated directly into the processor(s) 602.

The propulsion controller 604 communicates with the navigation system 608 (e.g., for adjusting the power of each propeller motor of the transportation unit 500 of FIG. 5 to guide the transportation unit along a determined flight path). The navigation system 608 may include a global positioning system (GPS), indoor positioning system (IPS), or other similar system and/or sensors that can be used to navigate the transportation unit 500 to and/or from a location. The item engagement mechanism controller 612 communicates with the motor(s) (e.g., a servo motor) used to engage and/or disengage items. For example, when the transportation unit is positioned over a level surface at a delivery location, the item engagement mechanism controller 612 may provide an instruction to a motor that controls the item engagement mechanism to release an item.

The network interface 616 may be configured to allow data to be exchanged between the transportation unit control system 510, other devices attached to a network, such as other computer systems (e.g., remote computing resources 310), and/or with transportation unit control systems of other transportation units. For example, the network interface 616 may enable wireless communication between the transportation unit 500 and the mobile base 200 and/or the mobile base management system 326 that is implemented on one or more of the remote computing resources 310. For wireless communication, an antenna of a transportation unit or other communication components may be utilized. As another example, the network interface 616 may enable wireless communication between numerous transportation units. In various implementations, the network interface 616 may support communication via wireless general data networks, such as a Wi-Fi network. For example, the network interface 616 may support communication via telecommunications networks such as cellular communication networks, satellite networks, and the like.

In some implementations, input/output devices 618 may include one or more displays, imaging devices, thermal sensors, infrared sensors, time of flight sensors, accelerometers, pressure sensors, weather sensors, etc. Multiple input/output devices 618 may be present and controlled by the transportation unit control system 510. One or more of these sensors may be utilized to assist in the landing as well as avoid obstacles during flight.

As shown in FIG. 6, the memory may include program instructions 622 that may be configured to implement the example processes and/or sub-processes described herein. The data storage 624 may include various data stores for maintaining data items that may be provided for determining travel paths, receiving items, landing, parking, identifying locations for engaging or disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the transportation unit control system 510 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The transportation unit control system 510 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated transportation unit control system 510. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the transportation unit control system 510 may be transmitted to the transportation unit control system 510 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other transportation unit control system configurations.

While the functional components of the example transportation unit 500 are discussed herein as part of the transportation unit 500, in other implementations, one or more of the functional components may be distributed throughout the mobile base 200 and/or implemented as part of the mobile base management system 326. For example, one or more of the aspects of the program instructions 622 may be implemented as part of the mobile base management system 326.

Figure 7:
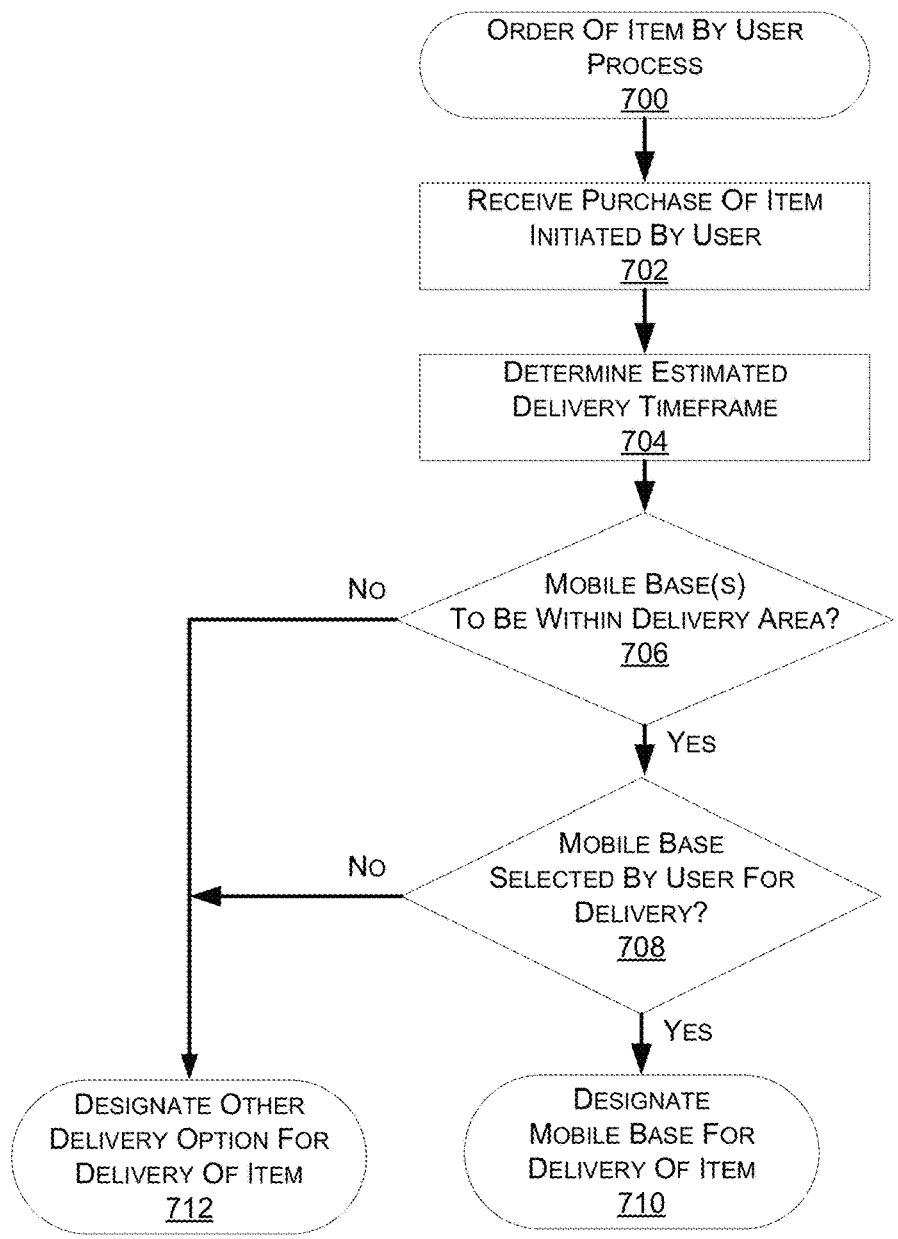
FIG. 7 is a flow diagram illustrating an example process for processing a user order for an item.

FIG. 7 is a flow diagram illustrating an example process 700 for processing a user order for an item. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 700 begins with the receipt of a purchase request initiated by a user, as in 702. Upon receiving a purchase request for an item from a user, a determination is made as to the estimated delivery timeframe for that item, as in 704. In some examples, this may include identifying a materials handling facility with the requested item in stock and estimating the time required to fulfill the item to the user. In other implementations, the estimated delivery timeframe may be a set day from the date of the purchase request or a series of days. For example, a user may specify that the delivery timeframe is to be one day from the date of the purchase request or between three and five days from the date of the purchase request. In still other implementations, the estimated delivery timeframe may be a set day of the week upon which the user has requested to have items delivered. For example, a user may preselect to have items ordered during the week delivered on Thursday of every week.

After the estimated delivery timeframe is determined, a determination is made as to whether a mobile base will be within a delivery area that includes a user specified delivery location, as in 706. As described above, in various implementations, mobile bases may follow scheduled routes or may otherwise be directed to service a delivery area. If it is determined that one or more mobile bases will be within the specified delivery area, a determination is made as to whether one of the mobile bases is selected by the user for delivery, as in 708. In various implementations, an interaction may be received from a user through a user interface that presents delivery options to the user and receives a selection from the user (e.g., for selecting an available mobile base or other delivery option). In addition, in various implementations a user may preselect or provide a preference for deliveries from a mobile base or other delivery options. A user may also be provided with options for selecting a type of transportation unit to be utilized for delivering the item from a mobile base (e.g., selecting a delivery by an automated aerial vehicle rather than a bicycle). In various implementations, different factors may be evaluated for determining whether a mobile base will be presented as an option for a delivery. For example, a mobile base's current available capacity, ability to handle items of certain sizes, suitability for delivering certain types of items (e.g., refrigerated or fragile), etc. may all be considered. If an available mobile base is selected by the user for delivery, the selected mobile base is designated for the delivery of the item, as in 710.

If it is determined that a mobile base is not selected for delivery, as in 708, or that no mobile bases will be within the delivery area, as in 706, another type of delivery option is designated (e.g., as selected by the user) for the item, as in 712. In various implementations, other delivery options may include traditional carrier deliveries, providing an item at a pickup location where a user may retrieve the item, etc.

Figure 8:
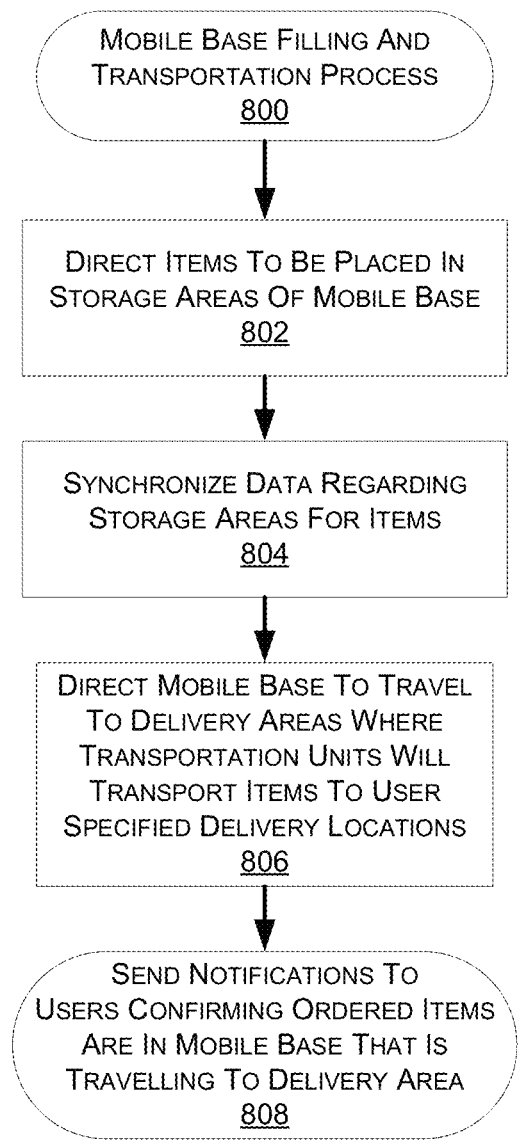
FIG. 8 is a flow diagram illustrating an example process for filling a mobile base with items.

FIG. 8 is a flow diagram illustrating an example process 800 for filling a mobile base with items for delivery. The example process begins by directing items to be placed into storage areas of the mobile base, as in 802. For example, as described above with respect to FIGS. 1 and 2, for items that have been ordered with a mobile base designated for the delivery, a materials handling facility may pick and place the ordered items in one or more storage areas (e.g., bins) of the mobile base. As also described above, mobile bases may also be used to deliver non-ordered items, such as high-volume and/or release day items. As another example, in addition or as an alternative to receiving items at a materials handling facility, the mobile base may also travel to a first receiving area or location for receiving items (e.g., from a merchant, vendor, etc.) before travelling to a final delivery area where items will be delivered.

After the items have been placed into the storage areas of the mobile base, data may be synchronized regarding the storage areas, as in 804. In various implementations, at least some of the data that is synchronized may be generated as the items are placed into the storage areas of the mobile base. For example, as described above with respect to FIG. 2, the mobile base and/or individual storage areas (e.g., bins) may include unique identifiers, such as a bar code, QR code, unique number, etc., to enable tracking, identification and association of items placed into the storage areas of the mobile base. Scanning of the identifiers for the storage areas and the picked items may result in the items becoming associated with the storage areas and tracked with the mobile base. In various implementations, the associated data may be synchronized among a computing system of the mobile base, the mobile base management system, and/or other systems.

After the data has been synchronized, the mobile base is directed to travel to a delivery area where transportation units will transport items to user specified delivery locations, as in 806. As described above with respect to FIG. 2, in various implementations the mobile base may include or otherwise be transported by any type of mobile machine, such as trucks, cars, watercraft, aircraft, etc., and control of the mobile machine may be manual (e.g., a driver) or automated (e.g., directly or remotely controlled by an automated system, robotic, etc.). As described above with respect to FIG. 4, in various implementations the delivery area that the mobile base travels to may include a number of user specified delivery locations.

Once the mobile base is in transit or has reached the delivery area, notifications may be sent to users confirming that ordered items are in the mobile base, as in 808. For example, a user may wish to receive a confirmation that an ordered item is in the mobile base and that the ordered item will soon be delivered by a transportation unit. In various implementations, such notifications may further indicate an estimated arrival time for the mobile base at the delivery area and/or of the transportation unit at the user specified delivery location. For example, GPS signals may be utilized to determine the coordinates of the mobile base and/or transportation unit. In various implementations, users may be able to view a map on a website that shows and updates the current location of the mobile base and/or transportation unit, or may otherwise receive notifications regarding current locations.

Figure 9:
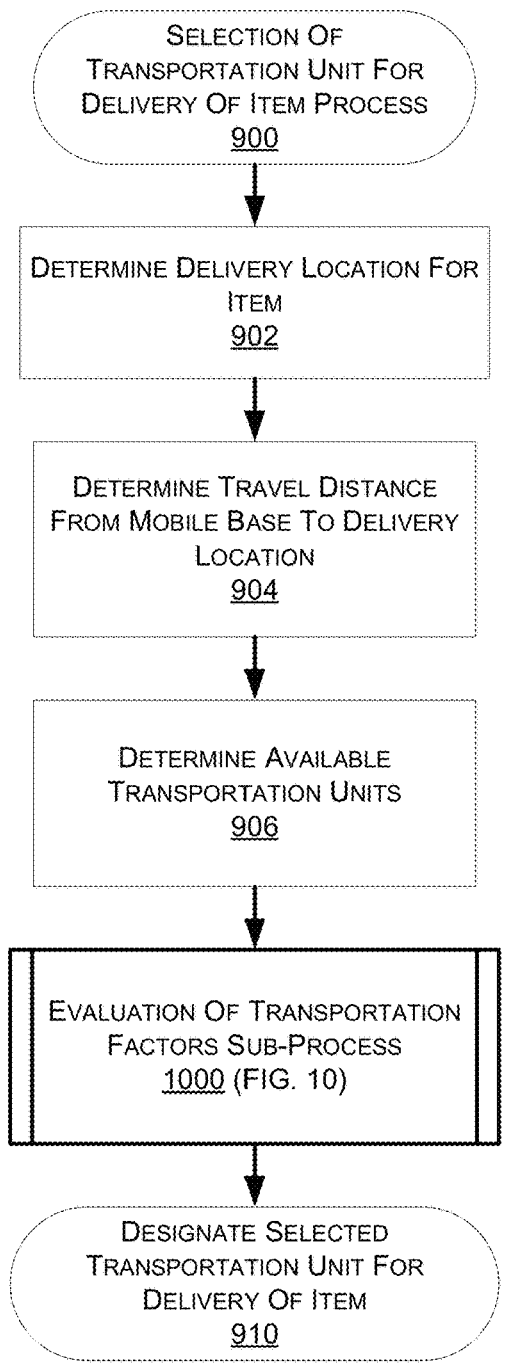
FIG. 9 is a flow diagram illustrating an example process for selecting a transportation unit for a delivery of an item from a mobile base.

FIG. 9 is a flow diagram illustrating an example process 900 for a selection of a transportation unit for a delivery of an item. The example process begins with a determination of a delivery location for an item, as in 902. For example, a delivery location may be specified in a user's order. After a delivery location is determined, a travel distance from the mobile base to the delivery location is determined, as in 904. In various implementations, different travel distances may be determined for different types of transportation units, as different types of transportation units may each travel by different types of delivery paths. For example, an automated aerial vehicle may be able to travel along a relatively straight route through the air, while a bicycle may need to travel certain types of pathways, an automobile may need to follow certain types of roadways, etc.

After the one or more travel distances are determined, the transportation units that are available for delivering the item are determined, as in 906. In various implementations, the availability of the transportation units may depend on certain factors. For example, only certain transportation units may currently be ready to travel (e.g., charged, fueled, etc.). As another example, only certain transportation units may have a sufficient range for the specified travel distance and/or capacity for carrying the type of item (e.g., due to weight, size, etc.).

Once the available transportation units are determined, a transportation factor evaluation sub-process is performed, as in 1000. An example transportation factor evaluation sub-process 1000 is described in more detail below with respect to FIG. 10. Based on the results of the transportation factor evaluation sub-process 1000, a selected transportation unit is designated for the delivery of the item, as in 910.

Figure 10:
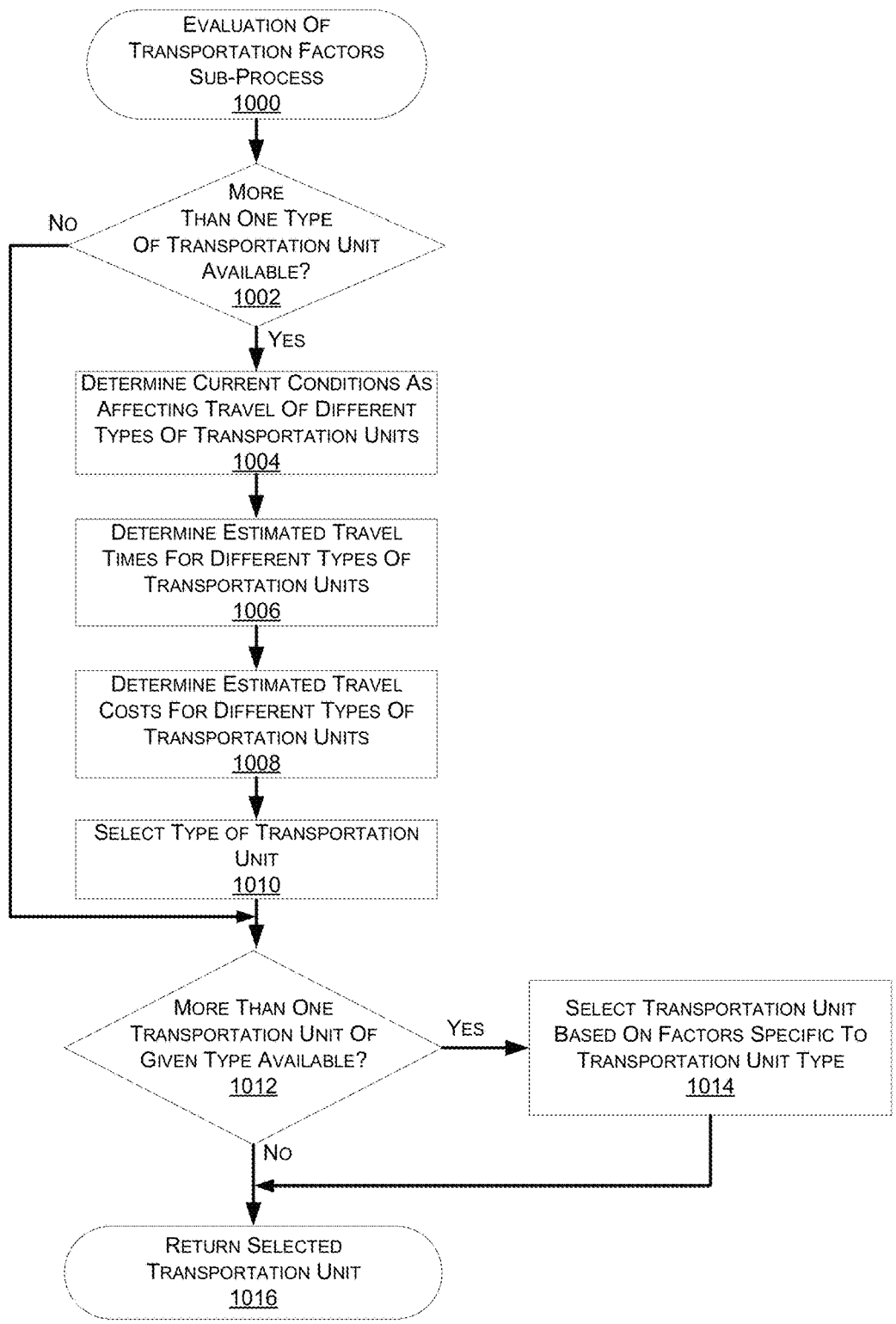
FIG. 10 is a flow diagram illustrating an example sub-process for evaluating transportation factors for selecting a transportation unit.

FIG. 10 is a flow diagram illustrating an example sub-process 1000 for evaluating transportation factors for selecting a transportation unit for transporting an item. The example sub-process begins with a determination as to whether more than one type of transportation unit is available, as in 1002. In various implementations, different types of transportation units may be utilized for transporting items to or from a mobile base. For example, some of the different types of transportation units that may be utilized may include automated aerial vehicles, bicycles, automobiles, mobile drive units, other automated mobile vehicles, other mobile machines, etc. In addition, in some implementations human agents (e.g., travelling on foot) may be utilized for transporting items to and from mobile bases.

If more than one type of transportation unit is determined to be available, a determination is made of current conditions that may affect the travel of the available types of transportation units, as in 1004. In various implementations, different types of current conditions (e.g., weather, traffic, etc.) may affect the travel of different types of transportation units differently. For example, heavy traffic may inhibit the travel of transportation units that are required to utilize roadways. As another example, high winds or other various weather conditions may affect the travel of an automated aerial vehicle. In yet another example, crowded conditions in an area where human beings have gathered may inhibit travel due to safety concerns with regard to certain types of transportation units. In various implementations, information regarding current conditions may be provided from various sources. For example, various sensors on a mobile base, remote computing resources, reports from one or more of the transportation units that are currently delivering items, etc., may provide information regarding current conditions.

After current conditions have been determined, estimated travel times may be determined for the different types of transportation units, as in 1006. In various implementations, the estimated travel times may depend on a number of factors. For example, different types of transportation units may be able to travel over different routes and/or at different speeds. The different speeds may depend on factors such as speed limits, advisable speeds for safety, economical factors (e.g., energy usage rates), etc. After the estimated travel times have been determined, estimated travel costs may be determined for the different types of transportation units, as in 1008. In various implementations, the estimated travel costs may depend on a number of factors. For example, one factor may be a current cost of energy or fuel. As another example, the length of the selected travel route or other travel factors may affect the estimated travel costs.

After the estimated travel costs have been determined, a type of transportation unit is selected for the delivery (e.g., based on an optimization function), as in 1010. In various implementations, an optimization function may be utilized that takes into account the determined transportation factors such as current conditions, estimated travel times, estimated travel costs, etc. In one implementation, the optimization function may determine a score for each type of transportation unit that is based on a selected weighting of the above transportation factors and may select the type of transportation unit that has the highest score. In another implementation, the selection of the type of transportation unit may be based primarily on one of the transportation factors. For example, a type of transportation unit may be selected based primarily on having the fastest travel time or the lowest travel cost for delivering the item. As another example, a type of transportation unit may be selected based primarily on a current condition (e.g., weather, traffic, etc.) inhibiting the travel of one or more alternative types of transportation units (e.g., an automated aerial vehicle may be selected over an automobile due to heavy traffic or a blocked roadway).

As noted above, the delivery paths that each type of transportation unit may be able to follow may be related to at least some of the transportation factors (e.g., travel times and travel costs), and in some instances the selection of a type of transportation unit may correspond to a preferred expected delivery path. For example, a preferred delivery path may correspond to one with the lowest associated cost or highest travel speed, or may be preferable due to other reasons (e.g., safety considerations for not flying through areas where human beings are likely to be encountered, etc.) It will be appreciated that in various implementations, certain of the factors (e.g., estimated travel times and estimated travel costs) may be adjustable for certain types of transportation units, such that the optimization process may be iterative and may consider and adjust the various transportation factors when making a selection. For example, different types of transportation units may have different costs or maximum travel ranges associated with different speeds of travel (e.g., due to reduced energy efficiency levels at higher travel speeds), for which different possible travel speeds may be considered when selecting a type of transportation unit. If different travel speeds are considered, once a type of transportation unit is selected based on a particular travel speed, that travel speed may be included in the instructions that are provided for the delivery of the item.

In various implementations, certain types of transportation units may be able to utilize multiple modes of travel. For example, an automated aerial vehicle may in addition to travelling by air also have capabilities for travelling along the ground. Some transportation units may also be able to travel with certain types of assistance (e.g., an automated aerial vehicle landing on a taxi, a bicycle placed on a rack on a public bus, etc.) Such alternatives may be considered when selecting a type of transportation unit. If different travel modes are considered, once a type of transportation unit is selected based on a particular travel mode or a combination of travel modes along a specified travel path, the travel mode(s) may be included in the instructions that are provided for the delivery of the item.

In various implementations, the selection of the transportation unit may also be based on other evaluations of the above noted or other transportation factors. For example, a mobile base may be expected to move from a first location to a second location during the time that a transportation unit will be delivering the item, and the selection of the type of transportation unit may be based at least in part on an ability of the type of transportation unit to return to the second location within a certain amount of time after the delivery of the item is complete (e.g., the type of transportation unit may need to have a minimum range or speed for meeting the mobile base at the new location). As another example, certain items may have associated target delivery times, for which a type of transportation unit may be selected for a delivery based at least in part on an ability to meet a target delivery time.

After a type of transportation unit has been selected, as in 1010, or if only one type of transportation unit is available, as in 1002, a determination is made as to whether more than one transportation unit of the type is available, as in 1012. For example, if the selected type of transportation unit is an automated aerial vehicle, the mobile base may have several automated aerial vehicles available to choose from for delivering the item. If more than one transportation unit of the selected type is available, one of the transportation units is selected for transporting the item based on factors specific to the type of transportation unit, as in 1014. For example, a transportation unit running on electricity which has been fully recharged may be selected over other similar transportation units of the same type that are then recharging. Once a transportation unit is selected as in 1014, or if only one transportation unit of a selected type is available, as in 1012, the identification of the selected transportation unit is returned, as in 1016.

In various implementations, a selection of a type of transportation unit may be changed for various reasons. For example, if a selected type of transportation unit has mechanical failure and is the only transportation unit of that type, or if a current condition has been determined to have changed significantly before a transportation unit has departed with an item (e.g., a weather condition arises rapidly, etc.), an evaluation may again be performed to determine if a different type of transportation unit should be selected.

Figure 11:
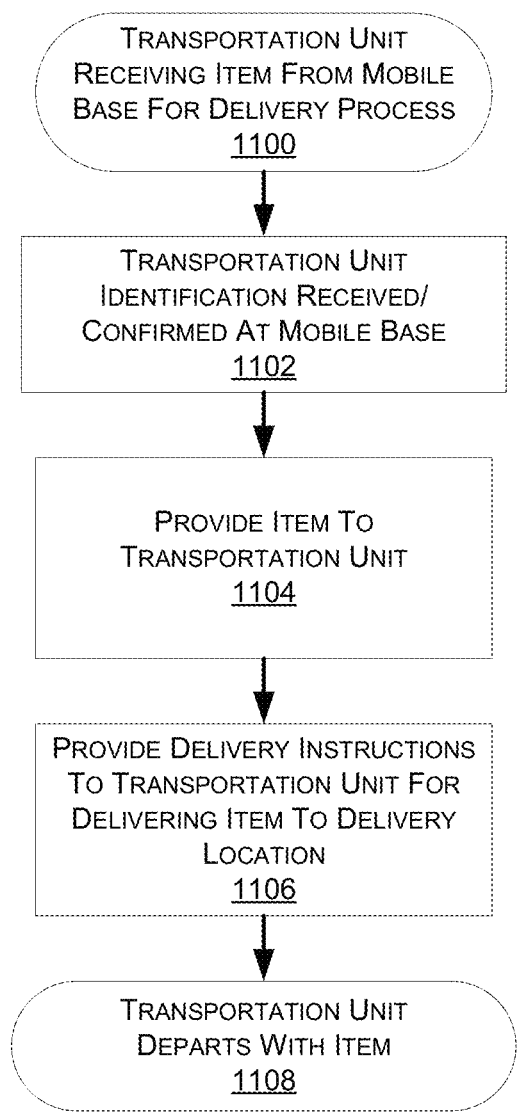
FIG. 11 is a flow diagram illustrating an example process for providing an item from a mobile base to a transportation unit.

FIG. 11 is a flow diagram illustrating an example process 1100 for a transportation unit receiving an item from a mobile base for delivery. The example process begins with a receipt/confirmation of an identification of a transportation unit at a mobile base, as in 1102. In various implementations, as described above, transportation units may travel to a mobile base for receiving items for delivery. For example, a transportation unit may be stationed at a fixed geographic location in a delivery area, and may travel to a mobile base when the mobile base is within the delivery area. The particular transportation unit may be identified at the mobile base in accordance with a unique identifier or other identification protocol that may be transmitted, scanned, etc. for identifying the transportation unit. For example, the transportation unit may transmit a coded sequence, include a barcode or QR code that may be scanned, or may otherwise be identified by the mobile base or mobile base management system. The identification of the transportation unit may be utilized to assist with determining which delivery the transportation unit is associated with, that the transportation unit is authorized for making the delivery, etc. In various implementations, transportation units may also be carried on a mobile base, for which the identifications may have previously been received/confirmed, and which may be utilized when activating a selected one of the transportation units for a delivery.

After a transportation unit identification has been received/confirmed at a mobile base, an item is provided to the transportation unit for delivery, as in 1104. In various implementations, items may be provided to transportation units in different ways. For example, the mobile base may include an opening in a roof, side, etc. which serves as an extraction point where an agent or an automatic storage and retrieval system may present an item for engagement by the transportation unit. For example, an item presented through an opening of the roof of the mobile base may allow an automated aerial vehicle to land for engaging the item. In various implementations, such maneuvers (e.g., an automated aerial vehicle landing on or taking off from the roof of a mobile base), may be accomplished even while the mobile base is in motion. For example, while the mobile base is traveling along a route, an automated aerial vehicle may be commanded to land on or take off from the roof of the mobile base with a received or otherwise engaged item without requiring the mobile base to stop.

Once the item has been provided to the transportation unit, instructions are provided for delivering the item to a delivery location, as in 1106. In various implementations, the transportation unit may also have been provided with the instructions for the delivery prior to receiving the item. For example, a remotely located transportation unit may receive the delivery instructions including the delivery location where the item is to be delivered at the same time that the transportation unit receives instructions including the location of the mobile base (e.g., a pickup location) where the transportation unit is to travel for receiving the item. As described above with respect to FIG. 3, in various implementations the delivery instructions, as well as other communications to the transportation unit, may be received from a mobile base, remote computing resource, mobile base management system, etc.

In various implementations, the delivery instructions may also include instructions regarding an interaction that is to be performed when a delivery is made. For example, a transportation unit may include an electronic pad for receiving a signature or otherwise be able to receive a specialized code from a user that confirms a receipt of the delivery. As another example, a transportation unit may be configured to receive payments (e.g., cash, electronic cards, electronic transfers, etc.) and the delivery instructions may indicate that the transportation unit is to collect a payment from the user when the delivery is made. After the transportation unit has received the delivery instructions, the transportation unit departs with the item, as in 1108.

Figure 12:
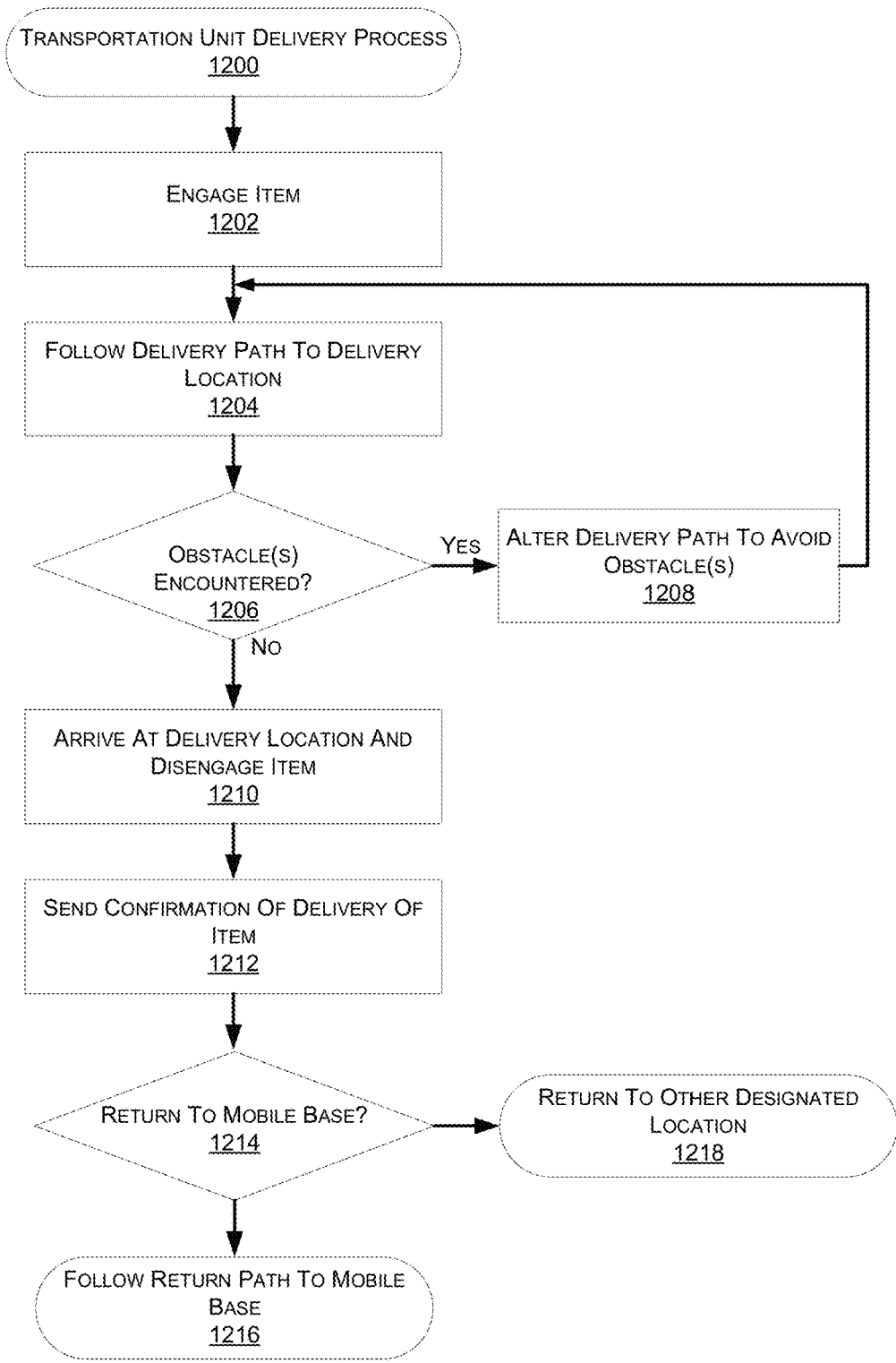
FIG. 12 is a flow diagram illustrating an example process for a transportation unit delivering an item.

FIG. 12 is a flow diagram illustrating an example process 1200 for a delivery of an item by a transportation unit. The example process begins with the transportation unit engaging the item, as in 1202. In various implementations, different types of transportation units may have different methods for engaging an item. For example, as described above with respect to FIG. 5, an automatic aerial vehicle may include an engagement mechanism for engaging an item.

After the item is engaged, a delivery path is followed to a delivery location, as in 1204. In various implementations, delivery path instructions may be received by the transportation unit (e.g., from the mobile base, from the mobile base management system, from a remote computing resource, etc.). As a delivery path is followed, a determination is made as to whether any obstacles are encountered, as in 1206. If obstacles are encountered, the path to the delivery location may be altered to avoid the obstacles, as in 1208. For example, an automated aerial vehicle may encounter obstacles along a flight path (e.g., buildings, trees, power lines, etc.) for which the flight path may be altered to fly over, under or around the obstacles. As another example, transportation units that follow roadways may encounter obstacles (e.g., construction, blocked roadways, etc.) for which a different route may be calculated and taken.

After the delivery path has been altered to avoid any obstacles, the transportation unit continues to travel along the altered delivery path, as in 1204, and if additional obstacles are encountered, the process for altering the delivery path for avoiding the obstacles is repeated, as in 1206 and 1208. Once the transportation unit has completed the altered delivery path, or if no obstacles have been encountered, as in 1206, the transportation unit arrives at the delivery location and disengages the item, as in 1210. As noted above, in various implementations the transportation unit may also be configured to perform an interaction when the item is disengaged (e.g., collecting a signature or payment for the item, etc.) After the transportation unit has disengaged the item, a confirmation of the delivery is sent from the transportation unit, as in 1212. In various implementations, the confirmation of the delivery of the item may be received by the mobile base, the mobile base management system, a remote computing resource, etc. and may be utilized for updating the status in the mobile base management system regarding the delivery of the item, for providing a notification to a user regarding the delivery, etc.

Once the confirmation of the delivery has been sent, a determination is made as to whether the transportation unit will return to the mobile base that the item was received from, as in 1214. For example, the transportation unit may be stationed at the mobile base and/or may otherwise receive instructions for returning to the mobile base (e.g., for making additional deliveries). If the transportation unit is to return to the mobile base, the transportation unit follows a return path to the mobile base, as in 1216. If the transportation unit is not to return to the mobile base, the transportation returns to another designated location, as in 1218. For example, the transportation unit may be stationed at a geographic location within the delivery area, which the transportation unit may return to after the delivery is complete. As another example, the transportation unit may travel to a different mobile base (e.g., if the other mobile base is closer, if the original mobile base has subsequently left the area, etc.).

In various implementations, certain portions of the example process 1200 may be repeated, in particular with regard to deliveries of multiple items. For example, if a transportation unit is carrying multiple items that are to be delivered to different delivery locations, the transportation unit may travel from one delivery location to another before returning to a mobile base or other designated location. As another example, a transportation unit may receive multiple items from different mobile bases or other receiving locations before delivering the multiple items to one or more delivery locations.

Figure 13:
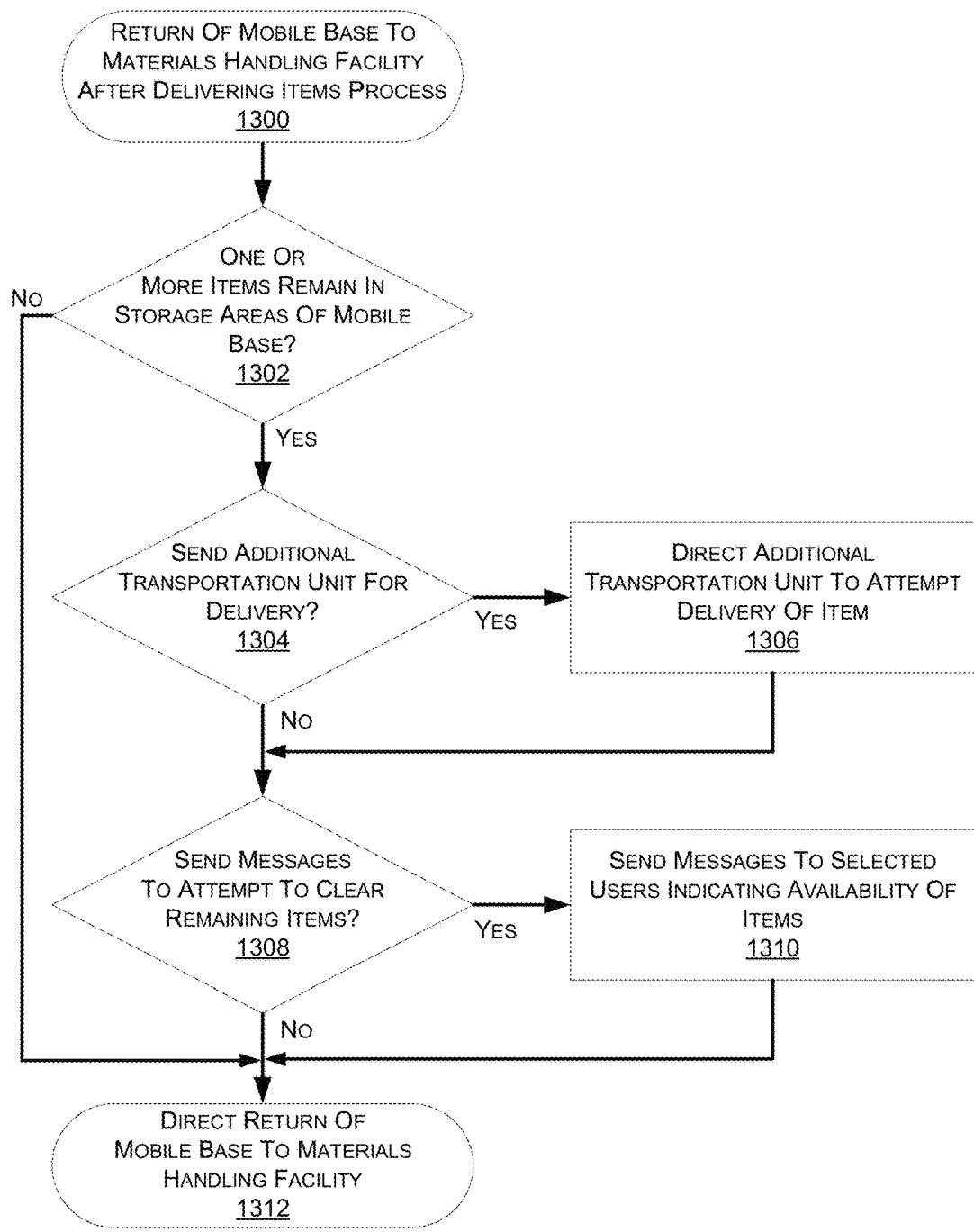
FIG. 13 is a flow diagram illustrating an example process for a mobile base returning to a materials handling facility after delivering items.

FIG. 13 is a flow diagram illustrating an example process 1300 for a mobile base returning to a materials handling facility after delivering items. The example process begins with a determination as to whether one or more items remain in storage areas of the mobile base at the time the mobile base is traveling back to the materials handling facility, as in 1302. In various implementations, items may remain in storage areas for a number of reasons. For example, a user may have cancelled an order, or otherwise instructed that the item should not be delivered at the present time. As another example, a transportation unit may have been unable to complete a delivery of an item (e.g., due to mechanical failure, current conditions inhibiting the travel of the transportation unit, etc.). As another example, various high volume or other extra items that were stocked in the mobile base may not have been sold.

If it is determined that one or more items remain in storage areas, a determination is made as to whether additional transportation units may be sent for attempting delivery of the one or more remaining items, as in 1304. In various implementations, an additional transportation unit may be sent to attempt delivery if the initial delivery attempt was not completed (e.g. due to mechanical failure, etc.). If an additional transportation unit is to be sent for the delivery, the additional transportation unit is directed to attempt delivery of the item, as in 1306.

If no additional transportation units are to be sent, as in 1304, or after any additional transportation units have been sent, as in 1306, a determination is made as to whether messages will be sent to attempt to clear remaining items, as in 1308. In various implementations, such messages may be utilized to sell extra or unclaimed items (e.g., additional high volume items or release day items that have not been sold, items that were part of a user order that has subsequently been cancelled, etc.). It will be appreciated that selling such items while they are still in the mobile base may save the time and expense associated with returning the items to the materials handling facility. Such offers to users for selling the items may indicate that the items are available to be delivered immediately via transportation units and may include discounts or other incentives to encourage users to purchase the remaining items. If such messages are to be sent, the messages are sent to selected users indicating the availability of the items, as in 1310. In various implementations, users may be selected for receiving messages based on proximity and/or other factors. For example, certain users may have indicated a desire to receive such messages when items are available, may be located near the current location of the mobile base, etc. In various implementations, if a user purchases an item in response to the messages, a transportation unit may be utilized to deliver the item from the mobile base to a delivery location that is specified by the user. After messages have been sent to selected users, as in 1310, or if no messages are to be sent, as in 1308, or if no items remain in storage areas, as in 1302, the mobile base is directed to return to the materials handling facility, as in 1312.

Figure 14:
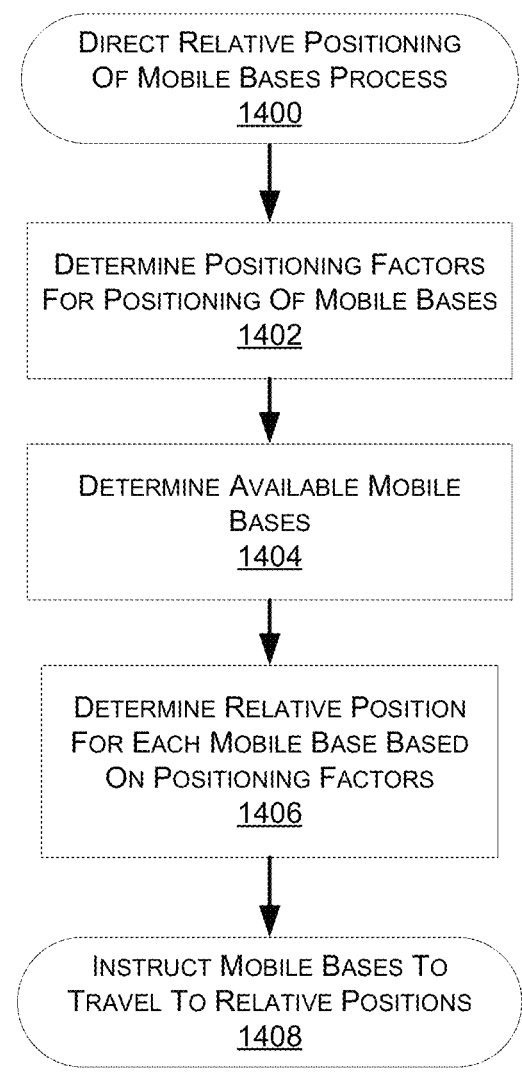
FIG. 14 is a flow diagram illustrating an example process for directing the relative positioning of mobile bases in an adjustable network.

FIG. 14 is a flow diagram illustrating an example process 1400 for directing a relative positioning of mobile bases in an adjustable network, as in 1400. The example process begins with a determination of positioning factors as related to the positioning of the mobile bases, as in 1402. In various implementations, the mobile base positioning factors may be related to data such as a number of scheduled or anticipated delivery and/or receiving locations in an area, an occurrence of a temporal event in an area that is expected to create a demand for deliveries of items, traffic conditions, weather, etc. For example, a sporting event (e.g., a football game) may be expected to create a high demand for deliveries of certain types of items (e.g., sporting paraphernalia, food items, etc.) in an area in or around where the sporting event is held. Similarly, merchants or vendors (e.g., of sporting paraphernalia, food items, etc.) in the area may wish to establish a number of receiving locations where items may be received by transportation units for delivery to users. As another example, an area that is experiencing conditions that result in slower travel times (e.g., due to an event, weather, traffic, etc.) may require more mobile bases and/or associated transportation units than usual for making deliveries due to the slower travel times.

After the mobile base positioning factors are determined, a determination is made as to what mobile bases are available within the network, as in 1404. For example, some mobile bases may currently be out of service or otherwise unavailable for use (e.g., due to having been previously designated for other areas, mechanical failure, etc.). After the available mobile bases have been determined, a relative position for each of the mobile bases is determined, as in 1406. In various implementations, an optimization method may be utilized for determining the relative positioning of each of the mobile bases. For example, an estimated number of delivery and/or receiving locations in an area and the geographic distributions of the delivery and/or receiving locations may be utilized to determine where a mobile base should be positioned in a given area and/or the relative spacing between mobile bases so as to best service any anticipated demand. Once the relative positions for each of the mobile bases have been determined, the mobile bases are instructed to travel to the relative positions, as in 1408.

In various implementations, the relative positions may each correspond to a different delivery and/or receiving area, wherein each of the areas may be defined as encompassing the delivery and/or receiving locations that items will be delivered to or received from by transportation units. In various implementations, the example process 1400 may also be repeated (e.g., at selected intervals, as mobile base positioning factors change, etc.). For example, if a mobile base positioning factor changes (e.g., due to an increase in a number of scheduled delivery or receiving locations in a new or existing area), the relative positions of the mobile bases may be adjusted and one or more of the mobile bases may be instructed to move to a different relative position corresponding to a different delivery and/or receiving area based on the change in the mobile base positioning factor.

Figure 15:
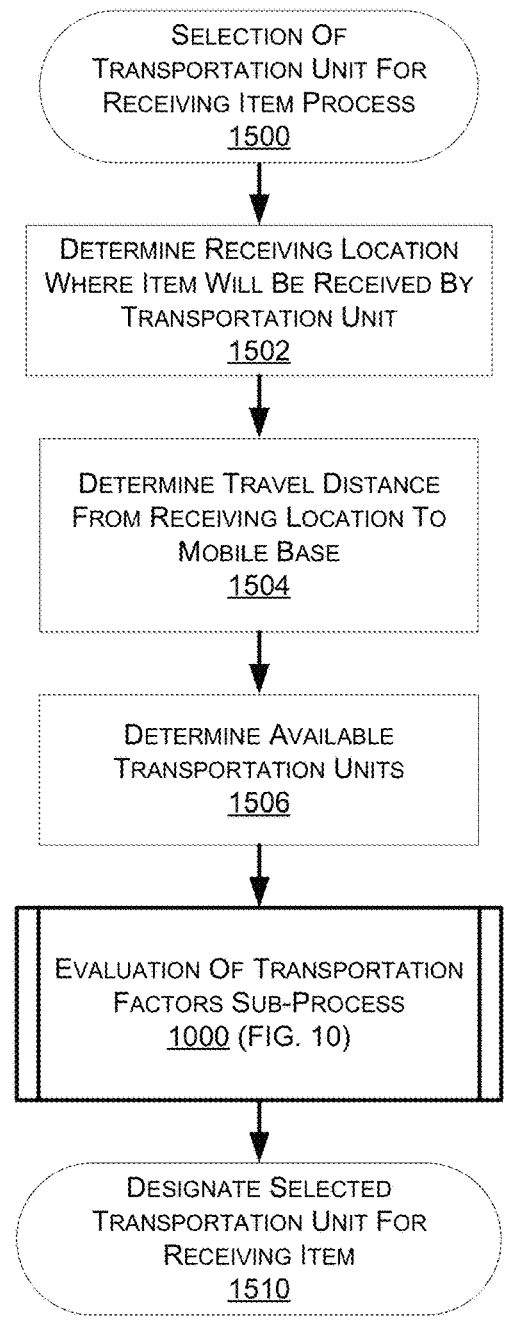
FIG. 15 is a flow diagram illustrating an example process for selecting a transportation unit for receiving an item from a receiving location.

FIG. 15 is a flow diagram illustrating an example process 1500 for a selection of a transportation unit for receiving an item from a receiving location. The example process begins with a determination of a receiving location that an item will be received from, as in 1502. For example, a receiving location for a merchant or a vendor may be at their place of business. As another example, a receiving location for a user who is returning an item may be at the user's residence or place of work.

After a receiving location has been determined, a travel distance from the receiving location to the mobile base is determined, as in 1504. In various implementations, different travel distances may be determined for different types of transportation units, as different types of transportation units may each travel by different types of travel paths. For example, an automated aerial vehicle may be able to travel along a relatively straight route through the air, while a bicycle may need to travel certain types of pathways, an automobile may need to follow certain types of roadways, etc.

After the one or more travel distances are determined, the transportation units that are available for receiving the item are determined, as in 1506. In various implementations, the availability of the transportation units may depend on certain factors. For example, only certain transportation units may be currently ready to travel (e.g., charged, fueled, etc.). As another example, only certain transportation units may have a sufficient range for the specified travel distance and/or capacity for carrying the type of item (e.g., due to weight, size, etc.). Once the available transportation units are determined, a transportation factor evaluation sub-process is performed as in 1000 (e.g., as previously described with respect to FIG. 10). Based on the results of the transportation factor evaluation sub-process 1000, the selected transportation unit is designated for receiving the item, as in 1510.

Figure 16:
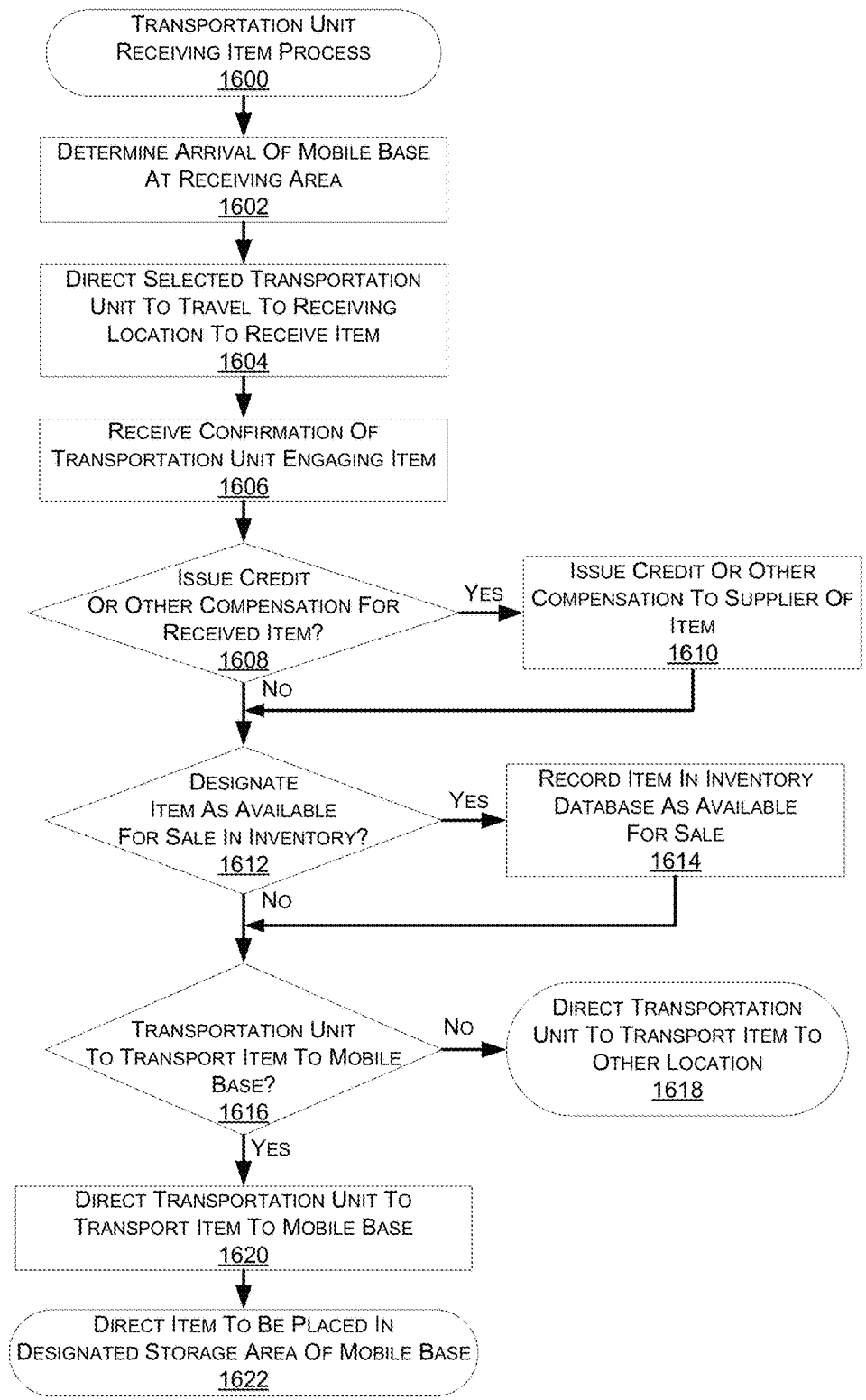
FIG. 16 is a flow diagram illustrating an example process for a transportation unit transporting a received item.

FIG. 16 is a flow diagram illustrating an example process 1600 for a transportation unit receiving an item from a receiving location. The example process begins with directing a mobile base to travel to a receiving area for an item, as in 1602. For example, a receiving area may include a number of receiving locations, as previously described with respect to FIG. 4. In various implementations, the receiving area that the mobile base is directed to travel to may be determined based on one or more mobile base positioning factors. For example, the mobile base positioning factors may be related to data such as a number of scheduled or anticipated receiving locations in the receiving area.

After the mobile base has arrived at the receiving area (e.g., as determined by GPS or other tracking technology), the selected transportation unit is directed to travel to a receiving location to receive the item, as in 1604. For example, if the transportation unit is stationed at the mobile base, the transportation unit may be provided with instructions to follow a route from the mobile base to the receiving location where the transportation unit is to engage the item. Alternatively, if the transportation unit is stationed remotely from the mobile base (e.g., at a location within the receiving area) the transportation unit may be directed to travel from that location to the receiving location. After the transportation unit has traveled to the receiving location, a confirmation may be received of the transportation unit engaging the item, as in 1606. For example, the transportation unit may be configured to transmit a confirmation to the mobile base or a remote computing resource (e.g., including a mobile base management system) when the item is engaged. In various implementations, as part of the process for engaging an item, the item may be inspected or otherwise examined. For example, the transportation unit may be configured (e.g., with various sensors, cameras, etc.) for determining that the item is as expected (e.g., determining that the correct item has been engaged, that the item is not damaged, etc.). Various safety protocols may also be performed when the item is engaged (e.g., examining the item to determine that it is not dangerous, hazardous, etc.).

After a confirmation is received of the transportation unit engaging the item, a determination is made as to whether a credit or other compensation will be issued for the received item, as in 1608. For example, a merchant's account may be automatically credited for an item once it is received by a transportation unit. As part of the crediting process, or as part of an alternative compensation process, payment for the item may also be made immediately from the transportation unit (e.g., the transportation unit may dispense cash, electronic payment, coupons, etc.). As another example, a refund or exchange process may be initiated for a user once an item for return is received by a transportation unit. Alternatively, such credits or other compensation may be issued after the item is transported by the transportation unit to the mobile base. It will be appreciated that by issuing credits or other compensation for received items when they are received by a transportation unit or mobile base, refunds, payments, etc. may be initiated more quickly (e.g., as compared to traditional systems where an item would need to be received at a materials handling facility before a credit for the item would be issued).

If a credit or other compensation is to be issued, then the credit or other compensation is issued to the supplier of the received item, as in 1610. After the credit or other compensation is issued, as in 1610, or if no credit or other compensation is to be issued for the item at the present time, as in 1608, a determination is made as to whether the item is to be designated as available for sale in an inventory database, as in 1612. In various implementations, an item may be designated as available for sale in an inventory database once the item has either been engaged by the transportation unit or received at the mobile base, and may subsequently be sold directly from the mobile base or from a materials handling facility that the item is transported to by the mobile base. In one implementation, the inventory database may be included in or otherwise associated with the materials handling facility. It will be appreciated that by designating items as available for sale in an inventory database when they are received by a transportation unit or mobile base, the inventory database may be updated more quickly to represent recently acquired items (e.g., as compared to traditional systems where an item may need to be received at a materials handling facility before it would be designated as available for sale in inventory). If the item is to be designated as available for sale, the item is recorded in the inventory database as available for sale, as in 1614.

After the item is recorded in the inventory database as available for sale as in 1614, or if the item is not to be designated as available for sale in inventory, as in 1612, a determination is made as to whether the transportation unit will transport the item to the mobile base, as in 1616. If the transportation unit is to not transport the item to the mobile base, then the transportation unit is directed to transport the item to another location, as in 1618. For example, a received item may be transported directly to a materials handling facility (e.g., if the materials handling facility is closer than the mobile base, if there is an urgency for the materials handling facility to receive the item, etc.). As another example, a received item may be transported to a second mobile base (e.g., if the second mobile base is closer, is in need of the item, etc.). As yet another example, as noted above, a received item may be designated as available for sale in inventory once it has been engaged by the transportation unit, and may immediately be sold or may have been pre-sold, in which case the transportation unit may be instructed to transport the sold item directly to a user specified delivery location.

If the transportation unit is to transport the item to the mobile base, then the transportation unit is directed to transport the item to the mobile base, as in 1620. With respect to the travel of the transportation unit to the mobile base, as described above with respect to FIG. 4, in various implementations, a mobile base may remain stationary or may continue to travel after a transportation unit departs to receive an item. If the mobile base will remain stationary, the instructions directing the transportation unit to return with the item may indicate the same location from which the transportation unit departed the mobile base. Alternatively, if the mobile base is expected to move to a new location after the transportation unit departs from the mobile base, the instructions directing the transportation unit to travel with the item from the receiving location back to the mobile base may include the new expected location of the mobile base. Furthermore, if the mobile base is continuing to move, the new expected location may be an estimated location based on an estimated time of arrival of the transportation unit.

The arrival of the transportation unit and/or the item at the mobile base may be determined at least in part in accordance with a unique identifier or other identification protocol that may be transmitted, scanned, etc. for identifying the transportation unit and/or item upon arrival. For example, the transportation unit may transmit a coded sequence, may include a barcode or QR code that can be scanned, or may otherwise be identified. After the transportation unit has been directed to transport the item to the mobile base and has arrived at the mobile base, the item is placed in a designated storage area of the mobile base, as in 1622. As described above with respect to FIG. 2, a mobile base may include storage areas (e.g., bins) including identifications or other mechanisms for organizing and tracking received items, and the item and storage area may be scanned or otherwise identified to record the item in inventory as currently stored in the identified storage area of the mobile base. As also described above, a mobile base may include an automatic storage and retrieval system that may receive the item from the transportation unit and automatically move the item to a designated storage area.

Figure 17:
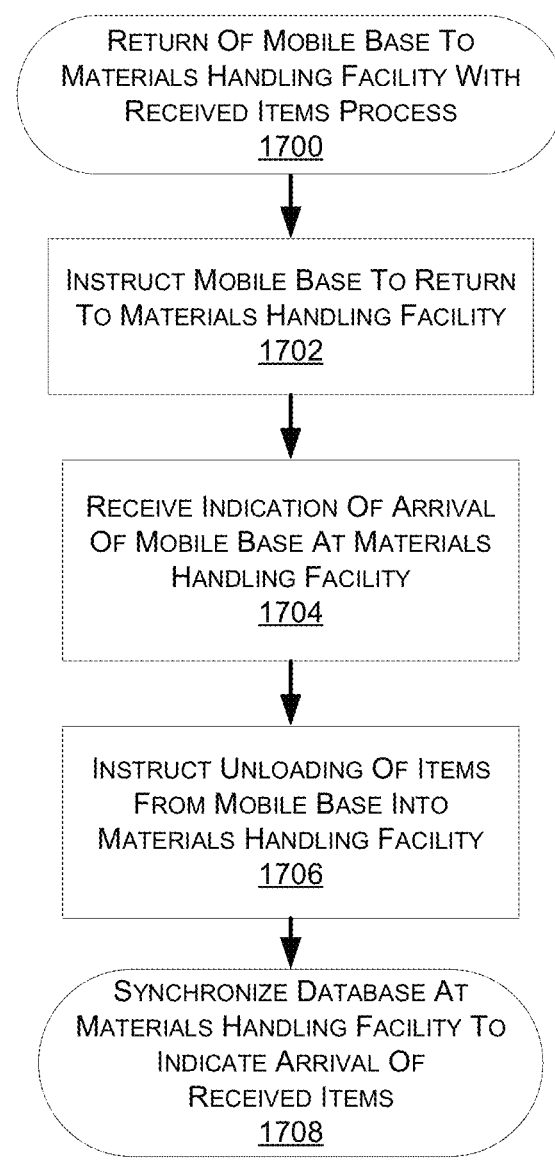
FIG. 17 is a flow diagram illustrating an example process for returning a mobile base to a materials handling facility after receiving items.

FIG. 17 is a flow diagram illustrating an example process 1700 for a mobile base returning to a materials handling facility with received items. The example process begins with an instruction for the mobile base to return to a materials handling facility, as in 1702. For example, a mobile base may be instructed to return to a materials handling facility once a designated route to various receiving areas has been completed. After the mobile base has been instructed to return to the materials handling facility, an indication is received of when the mobile base has arrived at the materials handling facility, as in 1704. For example, GPS tracking, visual identification, etc. may be utilized to determine when a mobile base has arrived.

After the mobile base has arrived at the materials handling facility, the items are unloaded from the mobile base into the materials handling facility, as in 1706. As described above, in various implementations, the items may be included in specified storage areas (e.g., bins) within the mobile base, for which the items may be removed and processed in various ways. For example, the items may be individually removed from the storage areas (e.g. including scanning of identifiers for the items and storage areas), or an entire section of storage areas (e.g. a bay of bins) may be removed from the mobile base for further processing inside the materials handling facility, etc. After the items have been unloaded, a database at the materials handling facility is synchronized to indicate the physical arrival of the received items, as in 1708.

Figure 18:
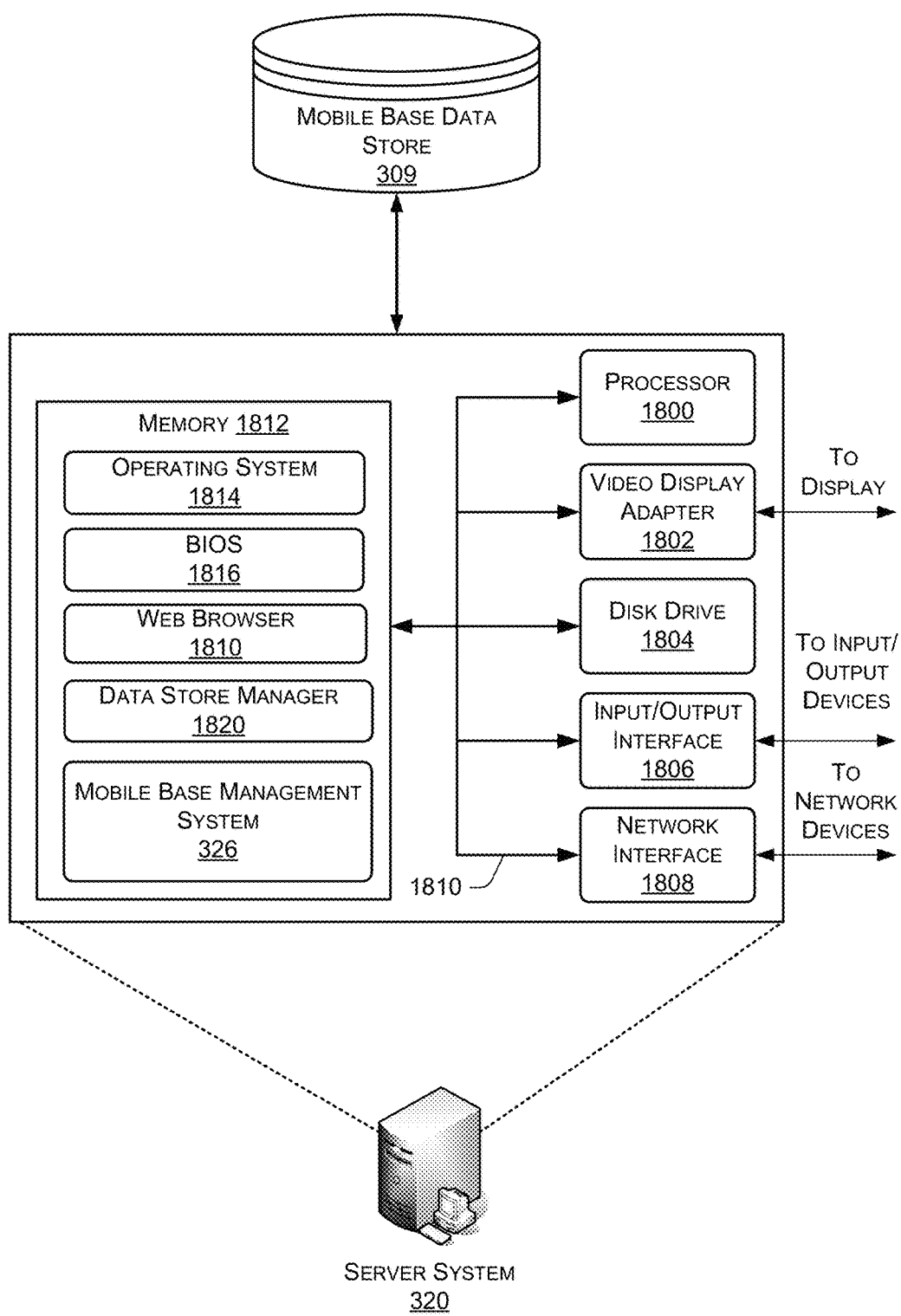
FIG. 18 is a block diagram of an illustrative implementation of a server system that may be used with various implementations.

FIG. 18 is a pictorial diagram of an illustrative implementation of a server system, such as the server system 320, that may be used in the implementations described herein. The server system 320 may include a processor 1800, such as one or more redundant processors, a video display adapter 1802, a disk drive 1804, an input/output interface 1806, a network interface 1808, and a memory 1812. The processor 1800, the video display adapter 1802, the disk drive 1804, the input/output interface 1806, the network interface 1808, and the memory 1812 may be communicatively coupled to each other by a communication bus 1810.

The video display adapter 1802 provides display signals to a local display (not shown in FIG. 18) permitting an agent of the server system 320 to monitor and configure operation of the server system 320 and/or to provide information (e.g., regarding transportation of an item by a mobile base 200 or transportation unit 500). The input/output interface 1806 likewise communicates with external input/output devices not shown in FIG. 18, such as a mouse, keyboard, scanner, or other input and output devices that can be operated by an agent of the server system 320. The network interface 1808 includes hardware, software, or any combination thereof, to communicate with other computing devices. For example, the network interface 1808 may be configured to provide communications between the server system 320 and other computing devices, such as that of a mobile base 200 or transportation unit 500, via a network.

The memory 1812 generally comprises random access memory (RAM), read-only memory (ROM), flash memory, and/or other volatile or permanent memory. The memory 1812 is shown storing an operating system 1814 for controlling the operation of the server system 320. A binary input/output system (BIOS) 1816 for controlling the low-level operation of the server system 320 is also stored in the memory 1812.

The memory 1812 additionally stores program code and data for providing network services to the mobile base 200, transportation unit 500, and/or mobile base management system 326. Accordingly, the memory 1812 may store a browser application 1818. The browser application 1818 comprises computer executable instructions, that, when executed by the processor 1800, generate or otherwise obtain configurable markup documents such as Web pages. The browser application 1818 communicates with a data store manager application 1820 to facilitate data exchange between the data store 309 and the mobile base management system 326.

As used herein, the term "data store" refers to any device or combination of devices capable of storing, accessing, and retrieving data, which may include any combination and number of data servers, databases, data storage devices and data storage media, in any standard, distributed or clustered environment. The server system 320 can include any appropriate hardware and software for integrating with the data store 309 as needed to execute aspects of one or more applications for a mobile base 200, transportation unit 500, and/or the mobile base management system 326.

The data store 309 can include several separate data tables, databases or other data storage mechanisms and media for storing data relating to a particular aspect. For example, the illustrated data store 309 includes mechanisms for maintaining information related to operations, inventory, maps, GPS data, etc., which can be used to generate and deliver information to a mobile base 200, transportation unit 500, the mobile base management system 326 and/or agents. It should be understood that there might be additional aspects that can be stored in the data store 309 and that additional data stores beyond the one illustrated may be included. The data store 309 is operable, through logic associated therewith, to receive instructions from the server system 320 and obtain, update or otherwise process data in response thereto.

The memory 1812 may also include the mobile base management system 326, discussed above. The mobile base management system 326 may be executable by the processor 1800 to implement one or more of the functions of the server system 320. In one implementation, the mobile base management system 326 may represent instructions embodied in one or more software programs stored in the memory 1812. In another implementation, the mobile base management system 326 can represent hardware, software instructions, or a combination thereof.

The server system 320, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction in FIG. 18 should be taken as being illustrative in nature and not limiting to the scope of the disclosure.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system to deliver items, the system comprising:
a mobile base configured to transport items to a delivery area, the delivery area comprising delivery locations;
an automated aerial vehicle (AAV) configured to deliver an item from the mobile base to a delivery location; and
a computing system, comprising:
one or more processors; and
a memory coupled to the one or more processors and storing program instructions that when executed by the one or more processors cause the one or more processors to at least:
determine a delivery location as specified in a user order for an item, wherein the ordered item is transported by the mobile base to the delivery area and the delivery location is in the delivery area;
provide instructions directing the AAV to transport the ordered item from the mobile base to the delivery location, wherein the instructions directing the AAV to transport the ordered item include a route from the mobile base to the delivery location;
provide instructions directing the AAV to disengage the ordered item at the delivery location; and
provide instructions directing the AAV to travel from the delivery location to the mobile base, wherein after the AAV departs from the mobile base, the mobile base is moved to a new location, and the instructions directing the AAV to travel from the delivery location to the mobile base include the new location of the mobile base.

2. The system of claim 1, wherein the AAV comprises a battery and the mobile base comprises a charging member and the program instructions when executed by the one or more processors further cause the one or more processors to provide instructions directing the AAV to engage with the charging member to recharge the battery of the AAV after travelling from the delivery location to the mobile base.

3. The system of claim 1, wherein the AAV is stationed on the mobile base and is transported by the mobile base.

4. The system of claim 1, wherein the mobile base comprises a roof with an opening in the roof of the mobile base that serves as an extraction point where the ordered item is provided to the AAV for transport to the delivery location.

5. The system of claim 4, wherein the AAV comprises an engagement mechanism that operates as a container that contains the ordered item that is transported to the delivery location.

6. The system of claim 4, wherein the mobile base is a truck.

7. A system to deliver items, the system comprising:
a mobile base configured to transport items to a delivery area, the delivery area comprising delivery locations, the mobile base comprising a roof with an opening in the roof of the mobile base that serves as an extraction point for an item in the mobile base that is to be delivered to a delivery location;
an automated aerial vehicle (AAV) configured to deliver an item from the mobile base to a delivery location; and
a computing system, comprising:
one or more processors; and
a memory coupled to the one or more processors and storing program instructions that when executed by the one or more processors cause the one or more processors to at least:
provide instructions directing the AAV to take off from the mobile base after an item in the mobile base has been received by the AAV at the extraction point of the mobile base, wherein the item is an ordered item and a user order for the item specifies a delivery location where the ordered item is to be delivered;
provide instructions directing the AAV to transport the ordered item from the mobile base to the delivery location, wherein the instructions directing the AAV to transport the ordered item include a route from the mobile base to the delivery location; and
provide instructions directing the AAV to travel from the delivery location to the mobile base and to land on the mobile base.

8. The system of claim 7, wherein after the AAV departs from the mobile base, the mobile base is moved to a new location, and the instructions directing the AAV to travel from the delivery location to the mobile base include the new location of the mobile base.

9. The system of claim 7, wherein the delivery area further comprises a second delivery location that the mobile base transports a second ordered item to.

10. The system of claim 7, wherein the mobile base comprises a truck.

11. The system of claim 7, wherein the AAV comprises an engagement mechanism that receives the ordered item at the extraction point of the mobile base.

12. The system of claim 7, wherein the AAV comprises a frame and a plurality of propeller motors that are spaced about the frame to fly to the AAV to transport the ordered item.

13. The system of claim 12, wherein the plurality of propeller motors comprises at least eight propeller motors.

14. The system of claim 12, wherein the AAV further comprises at least one battery to provide power for the plurality of propeller motors, and the mobile base further comprises charging capabilities that are utilized to recharge the at least one battery after the AAV travels from the delivery location to the mobile base.

15. A computer implemented method, comprising:
under control of one or more computing systems configured with executable instructions;
determining a delivery location as specified in a user order for an item, wherein the ordered item is transported in a mobile base to a delivery area that includes the delivery location;
providing instructions directing an automated aerial vehicle (AAV to transport the ordered item that is received by the AAV from the mobile base at an extraction point of the mobile base, wherein the instructions directing the AAV to transport the ordered item include the delivery location where the AAV is to deliver the ordered item;
providing instructions directing the AAV to disengage the ordered item at the delivery location; and
providing instructions directing the AAV to travel from the delivery location to the mobile base and to land on the mobile base, wherein after the AAV departs from the mobile base, the mobile base is moved to a new location and the AAV travels from the delivery location to the mobile base at the new location.

16. The computer implemented method of claim 15, wherein the instructions directing the AAV to travel from the delivery location to the mobile base include the new location of the mobile base.

17. The computer implemented method of claim 16, wherein the new location is a stopping point where the mobile base stops before continuing to travel along a scheduled route.

18. The computer implemented method of claim 15, further comprising providing instructions directing the AAV to utilize charging capabilities of the mobile base to recharge the AAV after the AAV travels from the delivery location to the mobile base.

19. The computer implemented method of claim 15, wherein the mobile base comprises a roof with an opening in the roof that serves as the extraction point where the ordered item is received by the AAV.

20. The computer implemented method of claim 19, wherein the ordered item is carried by the AAV through the opening in the roof of the mobile base that serves as the extraction point when the AAV takes off from the mobile base to transport the ordered item to the delivery location.

* * * * *